(12) United States Patent
Li et al.

(10) Patent No.: US 9,325,604 B2
(45) Date of Patent: Apr. 26, 2016

(54) SYSTEM AND METHOD FOR DATA CENTER OPTICAL CONNECTION

(71) Applicant: PLEXXI INC., Nashua, NH (US)

(72) Inventors: Ruoding Li, Carlisle, MA (US); Derek E. Spock, Boston, MA (US); Richard A. Barry, Los Angeles, CA (US)

(73) Assignee: PLEXXI INC., Nashua, NH (US)

( * ) Notice: Subject to any disclaimer, the term of this patent is extended or adjusted under 35 U.S.C. 154(b) by 0 days.

(21) Appl. No.: 14/211,505

(22) Filed: Mar. 14, 2014

(65) Prior Publication Data

US 2014/0270762 A1    Sep. 18, 2014

Related U.S. Application Data

(60) Provisional application No. 61/793,191, filed on Mar. 15, 2013, provisional application No. 61/845,587, filed on Jul. 12, 2013.

(51) Int. Cl.
*H04L 12/931* (2013.01)
*H04L 12/751* (2013.01)
*H04L 12/933* (2013.01)

(52) U.S. Cl.
CPC .............. *H04L 45/02* (2013.01); *H04L 49/45* (2013.01); *H04L 49/101* (2013.01); *H04L 49/15* (2013.01); *H04Q 2213/1301* (2013.01)

(58) Field of Classification Search
CPC ........ G02B 6/43; G02B 6/356; G02B 6/4246; G02B 5/4446; G02B 6/4452; H04Q 11/0001; H04Q 11/00; H04Q 1/13; H04Q 2213/1302; H04L 49/357; H04L 49/45; H04L 49/101; H04L 49/15; H04L 45/02
USPC ........................ 385/16, 135, 139, 71, 55, 45
See application file for complete search history.

(56) References Cited

U.S. PATENT DOCUMENTS

| 5,023,864 A | | 6/1991 | Cloonan et al. | |
|---|---|---|---|---|
| 5,475,679 A | * | 12/1995 | Munter | 370/395.4 |
| 5,499,239 A | * | 3/1996 | Munter | 370/423 |

(Continued)

FOREIGN PATENT DOCUMENTS

| EP | 2 429 122 | | 3/2012 | |
|---|---|---|---|---|
| JP | 2004102189 A | * | 4/2004 | G02B 6/04 |

(Continued)

OTHER PUBLICATIONS

Molex; Fiber Optic Product Families; FlexPlane Optical Circuit, Standard Routing 8-by-Perfect Shuffle, Kapton Substrate, 74.00mm Wide, 137.00mm, 1.50mm High; Date Unknown; 5 Pages.

(Continued)

*Primary Examiner* — Peter Radkowski
(74) *Attorney, Agent, or Firm* — Preti Flaherty Beliveau & Pachios LLP

(57) ABSTRACT

A connectivity device permits simplified connections for realizing complex networking topologies using lower cost components. The device can be optically passive, or can have an active aspect to control switching to realize additional topology related features. The device permits cabling to be simplified while reducing cost to permit implementations of complex networking topologies to be realized faster and with greater reliability. The device aids in scaling out a network implementation and can provide connectivity for an arbitrary number of nodes with efficient capacity usage.

12 Claims, 19 Drawing Sheets

(56) References Cited

U.S. PATENT DOCUMENTS

| | | | |
|---|---|---|---|
| 5,617,413 A * | 4/1997 | Monacos | 370/400 |
| 6,088,493 A * | 7/2000 | Brenner | 385/17 |
| 6,211,979 B1 * | 4/2001 | Kang et al. | 398/57 |
| 6,339,488 B1 * | 1/2002 | Beshai et al. | 398/59 |
| 6,914,231 B1 | 7/2005 | Stone | |
| 7,106,966 B1 * | 9/2006 | Lalonde et al. | 398/46 |
| 7,743,127 B2 | 6/2010 | Santos et al. | |
| 8,798,431 B2 * | 8/2014 | Julien et al. | 385/138 |
| 8,842,988 B2 * | 9/2014 | Spock et al. | 398/45 |
| 2002/0048066 A1 * | 4/2002 | Antoniades et al. | 359/128 |
| 2003/0031449 A1 * | 2/2003 | Simmons et al. | 385/134 |
| 2003/0118313 A1 | 6/2003 | Nicolas | |
| 2003/0210870 A1 | 11/2003 | Graves | |
| 2007/0258715 A1 * | 11/2007 | Androni et al. | 398/79 |
| 2009/0328133 A1 | 12/2009 | Strassner et al. | |
| 2012/0321309 A1 * | 12/2012 | Barry et al. | 398/51 |
| 2012/0321310 A1 * | 12/2012 | Spock et al. | 398/59 |
| 2013/0322838 A1 * | 12/2013 | Julien et al. | 385/135 |

FOREIGN PATENT DOCUMENTS

| | | |
|---|---|---|
| WO | WO 2009/042919 | 4/2009 |
| WO | WO 2010/133114 | 11/2010 |

OTHER PUBLICATIONS

High Performance Datacenter Networks; Architectures, Algorithms, and Opportunities; Dennis Abts and John Kim; 2011; 115 Pages.

Sudevalayam, Sujesha et al., "Affinity-aware Modeling of CPU Usage for Provisioning Virtualized Applications," 2011 IEEE 4th International Conference on Cloud Computing, Jul. 4, 2011, pp. 139-146, XP031934583.

* cited by examiner

SYSTEM AND METHOD FOR DATA CENTER OPTICAL CONNECTION

The present application claims benefit of U.S. Provisional Application No. 61/793,191, filed Mar. 15, 2013 and entitled "SYSTEM AND METHOD FOR DATA CENTER OPTICAL CONNECTION," and also claims benefit of U.S. Provisional Application No. 61/845,587, filed Jul. 12, 2013, entitled "SYSTEM AND METHOD FOR DATA CENTER OPTICAL CONNECTION," the entire disclosures of which are hereby incorporated herein by reference.

STATEMENT REGARDING FEDERALLY SPONSORED RESEARCH OR DEVELOPMENT (Not Applicable)

BACKGROUND OF THE INVENTION

Communication networks tend to be constructed according to various physical and/or logical topologies, which can often depend on the capabilities of the components of the communication network. For example, FIG. 1 shows a communication network 100 in a hierarchical topology previously used in enterprise and data center communication networks.

Network 100 has a lower layer 110 comprised of servers 112, which are typically rack mounted or otherwise concentrated with regard to physical location. A layer 120 uses layer 2 top-of-the rack (TOR) switches 122 to connect servers 112. A layer 130 is composed of layer 2 and/or layer 3 aggregation switches (AS) 132 to interconnect several TOR switches 122. A layer 140 is the top layer of network 100, and is composed of core routers (CR) 142 that connect aggregation switches 132. Often, core routers 142 also function as a gateway to connect to an Internet 150.

One major drawback of the network architecture of network 100 is the design orientation mostly for network traffic from users to the servers, so-called North-South traffic that travels in a generally vertical direction in network 100. Due to the very high oversubscription ratio from layer 120 to layer 140, which is collectively from about 1:80 to about 1:240, the so-called West-East traffic between servers 112 that travels in a generally horizontal direction in network 100 can be subject to performance issues. For example, such high oversubscription ratios can create a bottle neck for traffic between servers 112, since the traffic typically flows through layers 120, 130 and 140, rather than directly between servers 112.

Several network topologies have been proposed to overcome the above-mentioned drawback of network 100, where the architecture aim is to flatten the network topology to promote West-East traffic and reduce the oversubscription ratio to a more reasonable of 1:3 to even 1:1. FIG. 2 shows a communication network 200, which is an example of a so-called fat-tree topology for a data center. The topology of network 200 is a special type of Clos topology that is organized in a tree-like structure. Clos topologies help to reduce physical circuit switching needs with respect to the capacity of the switches used to implement the topology. This type of topology is built of k-port switches, and has k pods of switches. Each pod has two layers of switches, each layer has k/2 switches and each pod connects with $(k/2)^2$ servers. There are $(k/2)^2$ core switches, which connect with k pods. The total number of servers supported is $k^3/4$. Network 200 shows an example of the fat-tree topology with k=4. Accordingly, each switch 202 has four ports, there are four pods 210, 211, 212 and 213, with two layers and two switches in each layer. Each pod 210-213 connects with four servers 220, for a total of sixteen servers supported. There are four core switches 230 that connect with four pods 210-213. Note that although network 200 has twenty switches 202, compared to fourteen for network 100 (FIG. 1), each of switches 202 has four ports. Thus, the topology of network 200 can permit greater West-East traffic through-flow than network 100, and can reduce the oversubscription ratio with switches that have a relatively small number of ports. Also, network 200 avoids the use of expensive core routers 142 (FIG. 1). Network 200 also scales to larger server connections by adding more layers.

Besides fat-tree, other network topologies based on Clos architecture have been proposed, such as the spine and leaf topology of network 300 of FIG. 3. The topology of network 300 can be viewed as a folded Clos topology, and scales to larger server connections by adding more layers. Unlike the architecture of network 100 that has two big core routers 142, in the folded Clos design of network 300, each of layers 330 and 340 uses a relatively large number of switches that are connected to a lower layer.

However, fundamentally, both fat-tree and folded Clos architecture are topologically similar to traditional layered network, in that they are all assembled in a tree like topology. The difference is the fat-tree and folded Clos arrangements use a series of switches in the top layer, while the traditional network uses one or more big routers at a top layer. These architectures are often called "scale-out" architecture rather than "scale-up" (bigger router) architecture.

One drawback of fat-tree and folded Clos architectures is the increased number of switches used. In addition, large numbers of cable connections are made between all the switches being used to implement the architectures. The complexity of the cabling connectivity and the sheer number of cables used to implement these architectures make them less attractive from a practicality viewpoint. Moreover, in practice, these architectures tend to scale poorly once the network has been built, due at least in part to the further increased complexity of cable connections.

FIG. 4 shows a network 400 that is implemented in a meshed ring architecture, where each switch 402 has a direct connection with all of the other switches 402. However, this architecture is limited in terms of scalability, since the size is limited by the total number of switch ports available for interconnection for each switch, similar to the problem addressed with the Clos related topologies discussed above.

FIG. 5 shows a network 500 organized as a three dimension flattened butterfly topology. This topology of network 500 can scale to large numbers of switch nodes 510 that can support a relatively large number of servers in a relatively large data center. Network 500 can be built using the same organization for switch nodes 510 for the entirety of network 510, and offer flat network topology, higher bisection bandwidth, and low hop counts. However, three dimension flattened butterfly architectures tend to have a high port count per switch, which tends to increase costs, and use long global connections, which tend to be relatively expensive and also add to implementation costs.

While the architectures illustrated in FIGS. 4 and 5 are attractive for a data center network from the perspective of performance, the complicated connectivity and cabling make networks 400 and 500 difficult to implement in practice in a data center environment. In addition to the complexity, the costs tend to be driven up by relatively expensive cabling used to implement the topology.

For example, optical cabling is often used to increase speed and throughput in a data center network. Switch ports are directly connected to other switch ports according to the topology configuration, so careful mapping of ports that may be physically separated by relatively large distances is undertaken. In addition, the physical reach of the optical cables is often expected to be greater than 100 meters. If there is a problem with cable or switch component malfunction, correction of the problem can be costly as well as complicated to implement, since switches and/or cables may need to be installed, and correctly connected in accordance with the complex topology being implemented.

As data centers become more like high performance computing (HPC) platforms, many of the network topologies used in HPC have been proposed for data center networks. However, the topologies employed in an HPC application do not translate well to data center network environments, since the HPC computer processors tend to be densely packed, and the networking connections tend to be restricted to a smaller space, thus limiting complexity and cost for those applications.

In addition, networks implemented with architectures such as those illustrated in FIGS. 4 and 5 can be prohibitively costly to implement all at once for some applications. It is often desirable to implement a smaller scale ring mesh or multi-dimensional network topology, to which additional components and switches can later be added. Adding on switches, nodes or other components is often called "scaling out", and is attractive from a cost perspective, since the entire cost of the full network architecture can be deferred in favor of an initial, smaller network. However, scaling out an existing network topology presents a number of challenges related to complexity of interconnections and the number of cables and ports that are reconfigured to permit the additional components to be added to the network topology. Often, the increased complexity of cable connections alone make scaling out efforts complicated and expensive to implement.

In addition to the challenges of scaling out an existing network topology, there is often a cost issue associated with purchasing equipment that is intended for a larger network, but used to implement a smaller network, with the expectation of scaling out the network at a later time. In such a case where a larger network topology is planned, but a smaller network topology is actually implemented in the near term, the purchased components can be designed for a much larger network than is actually implemented. The cost of such components tends to be significantly greater than comparable components used with a smaller network topology owing largely to the greater expected capacity to be handled with the larger scale. Such initial stages of large scale implementations often lead to somewhat isolated network capacity that goes unused for a significant period of time, which can have a significant negative impact on cost budgets for implementing a desired network topology. This type of purposely implemented unused capacity is sometimes referred to as "stranded bandwidth", since the equipment is capable of supporting greater bandwidth than is actually used, and the cost associated with the unused bandwidth is invested in such equipment with deferred implementation, thereby increasing the effective cost of the network implementation.

BRIEF SUMMARY OF THE INVENTION

The present disclosure provides a connectivity device that permits simplified connections for realizing complex networking topologies using lower cost components. The device can be optically passive, or can have an active aspect to control switching to realize additional topology related features. The device permits cabling to be simplified and permits reduced cost cabling to be used to make connections while providing implementations of complex networking topologies. The device assists in simplifying connectivity implementation, so that complex networking topologies can be realized faster and with greater reliability.

Typically, data center network implementation involves connectivity that uses optical technology, which tends to dictate at least a portion of implementation cost. Some of the types of optical technology used for connectivity can include:

DWDM 10G SFP+
CWDM 10G 10 km SFP+
850 nm 300 meter SR SFP+
Silicon Photonics 4 km 4 × 10G
850 nm 12 × 10G miniPod, 100 meter The above 850 nm 12 channel module tends to be the lowest cost solution but may be limited to a 100 meter reach. The Silicon Photonics 40G QSFP+ (from Molex) can reach 4 km and the cost can be one quarter of the CWDM SFP+ solution. Although the Silicon Photonics 40G QSFP+ is not CWDM, it can advantageously be used in a low cost solution in accordance with the present disclosure in a low cost 1 U fiber shuffle device. Advantageously, the fiber shuffle device can scale with 4 degree Switch2 for 2-D mesh. In addition, multiple fiber shuffle devices can be used together to implement such topologies as a two dimensional torus mesh or other two and three dimensional topologies.

The fiber shuffle device organizes multi-fiber MTP (multi-fiber termination push-on) fiber into various topologies according to user design, and can accommodate such topologies as an 11 node mesh ring. For example, the fiber shuffle device can be provided with a front panel that has 11 West/East 24 SM fiber string MTP connectors. Inside the fiber shuffle device, the 24 fibers are broken up to make 11 node mesh connections in accordance with current CWDM ring topology. The fiber shuffle device can be made scalable beyond 11 nodes by adding more ports and additional cables internally.

The term "port" is used herein to mean one or more connectors or connections that connect one or more devices (such as fiber shuffle devices), switches or nodes to other devices, switches or nodes. For example, a port can include a number of connectors that provide fiber cable connectivity to a number of other devices, where the fiber cable is composed of popular numbers of fibers, such as 12, 24, 48 or 72 fibers, or is composed of an arbitrary number of fibers. A port can include a pair of connectors, such as is provided in an east/west connector pair configuration. In general, the term "port" is used herein to denote a connection or group of associated connections to simplify explanations, although more specific references to ports, connectors or connections are provided where appropriate.

In addition, the term "node" is used to connote a junction in a network, and can be electronic, electo-optical and/or optical in structure. A node can include one or more switches and/or transceivers that are electronic, elctro-optical and/or optical in structure. Accordingly, a node can include one or more optical ports, and can optically connect to one or more other devices, including other nodes, switches or transceivers, as well as one or more of the fiber shuffle devices according to the present disclosure.

According to another aspect of the present disclosure, a fiber shuffle device is provided that can accommodate relatively small and relatively large network topologies with reduced complexity and simplified scale-out options. The fiber shuffle device can be implemented as a low cost 1 U device with a number of MTP connection receptacles. The MTP connection receptacles are designed to receive MTP cable plugs to implement cable connectivity with the fiber shuffle device. In the present description, MTP connection plugs and receptacles are referred to as "connectors" to simplify the discussion in the general case, and with the more specific terms used separately to designate the specific functions of the plug or receptacle. According to one aspect, sets of MTP connectors are organized that permit a smaller scale network topology to be deployed, using one set of MTP connectors for connections, for example, while reserving another set for scale-out deployments.

The fiber shuffle device can be passive, with a number of optical fibers providing pathways between the various MTP connectors. Each MTP connector can have any number of desired optical fibers, including popular connector types that house 12, 24 or 48 optical fibers, for example. The internal connectivity of the optical fibers in the fiber shuffle device are arranged as direct connections between MTP connectors. The wiring of the optical fibers within the fiber shuffle device is arranged to permit connectivity for east-west connections which can be expanded for additional east-west connections when scale-outs are desired.

Multiple fiber shuffle devices can be used to implement complex network topologies, by degrees, including such topologies as single or multi-dimensional ring meshes, chordal rings, toroid meshes, flattened butterfly architectures and grid architectures. The arrangement of the fiber shuffle device permits the topologies to be implemented with a small number of switches or nodes, and scale-out to significantly larger networks with tens or hundreds of switches or nodes, without significantly increasing complexity or relative costs, since low cost optical fiber connectors can be used to connect switches or nodes, and the switches or nodes themselves need not have a high port count. In addition, the number of cables used to implement complex topologies can be reduced, even as the network is scaled-out.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Data center switches and routers can utilize fiber optical interconnections through their network interface ports. In accordance with the present disclosure, a separate network topology configuration unit is provided that consists of fiber optical connectors and internal fiber optical interconnections that can be used to implement desired network topologies.

Figure 6:
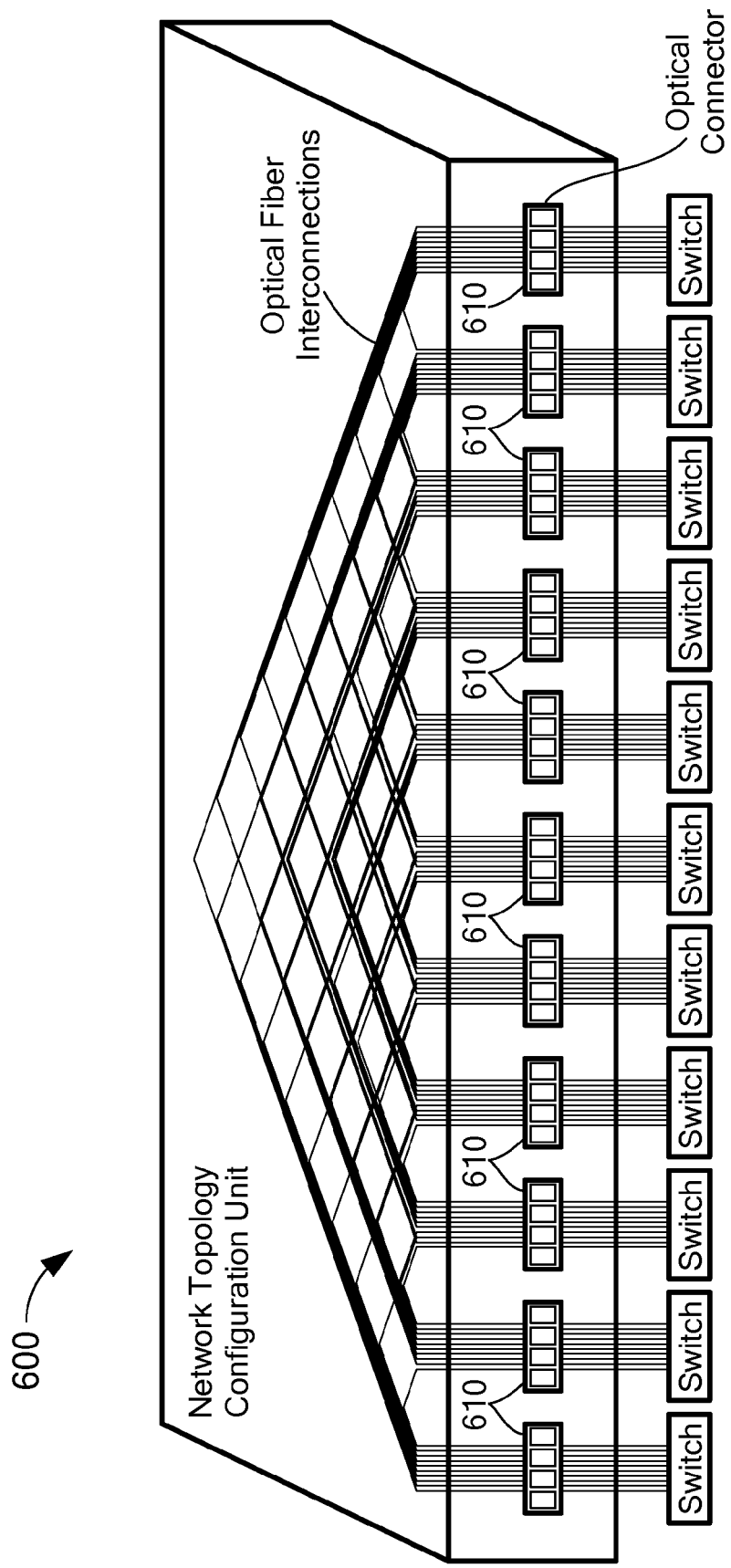
FIG. 6 is an illustration of a connectivity device in accordance with an exemplary embodiment of the present disclosure.

FIG. 6 illustrates a network topology configuration unit (NTCU) 600 in accordance with an exemplary embodiment of the present disclosure. The network interface ports of each switch are connected via optical fiber to NTCU 600 on optical connectors 610 rather than being connected directly to other switches via network interface ports. Such connection can be facilitated by using standard optical transceivers such as SFP+, QSFP, CXP, or any other type of standard or proprietary optical transceivers. The optical transceivers can be connected to optical connectors 610 using optical fiber cables. The connections made to NTCU 600 are arranged to implement a desired network topology configuration.

Figure 4:
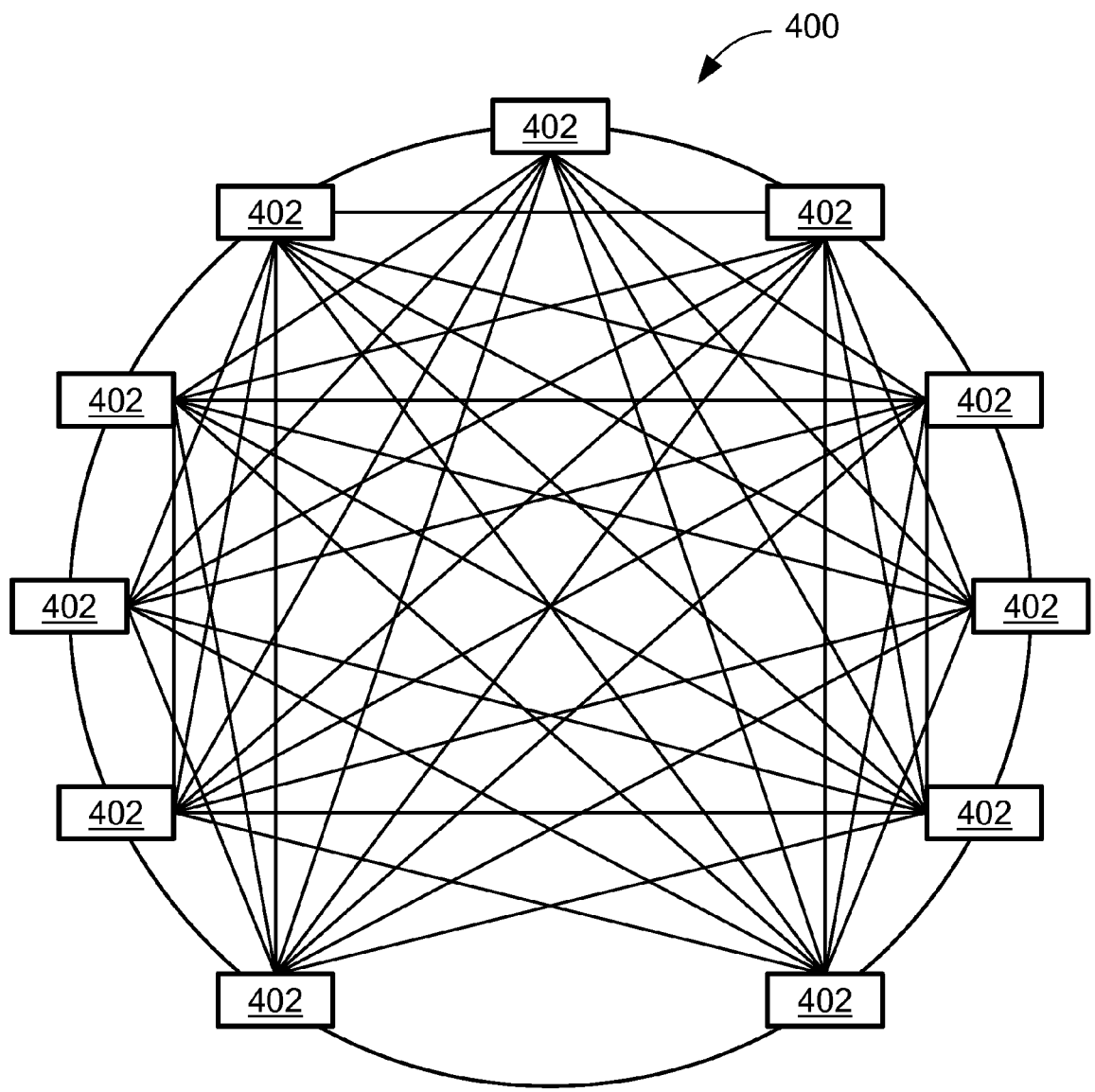
FIG. 4 is an illustration of a network organized according to a meshed ring topology.
Figure 5:
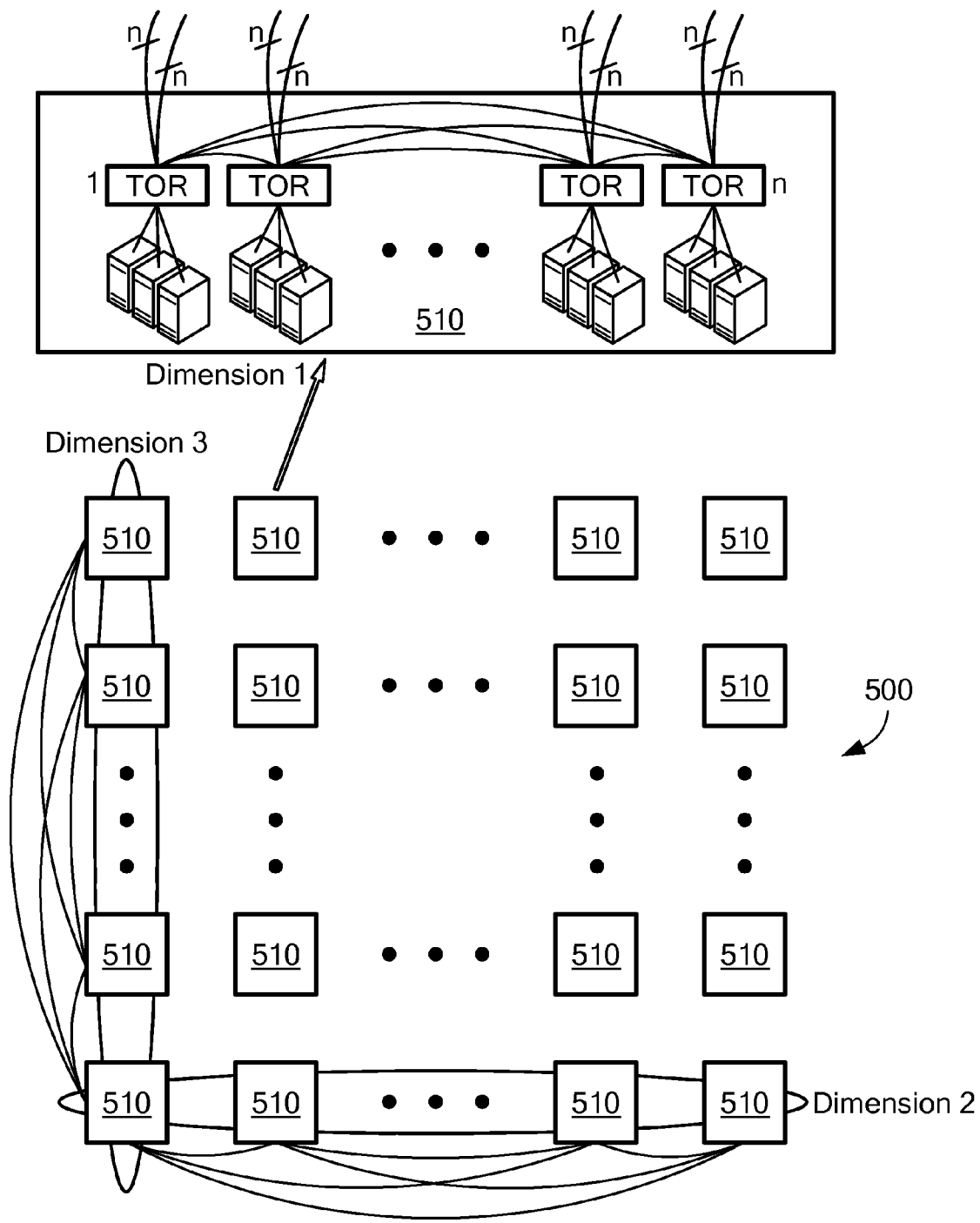
FIG. 5 is an illustration of a network organized according to a three dimension flattened butterfly topology.

In the exemplary embodiment shown in FIG. 6, the optical fiber interconnections are arranged to form a meshed network topology between attached switches, such as is illustrated in FIG. 4, where each switch is directly connected to every other switch. In accordance with this embodiment, the meshed ring topology of network 400 (FIG. 4) can be implemented with one or more cables run from each switch 402 directly to NTCU 600, where the connections to every other switch is made. For example, multi-fiber can be bounded using high fiber count connectors such as 12 fiber, 24 fiber, 48 fiber MTP/MPO connectors and run directly from each switch to NTCU 600, further simplify the wiring task. Thus, network 400 can be implemented with 11 cable connections, rather than having to run separate cables for interconnecting each switch, a total of 55 cables, as suggested by the topology illustrated in FIG. 4, to realize the 11 node meshed ring topology. The use of NTCU 600 thus permits cabling and connection tasks to be greatly simplified, which significantly reduces the possibility of wiring mistakes, in addition to decreasing costs for cabling. Also, each of the switches in network 400 can be implemented with a single port or MTP cable connection, which is directly connected to NTCU 600, rather than being implemented with 10 separate ports, as would be suggested by the topology of network 400, as illustrated in FIG. 4. Such a reduction in the number of ports provided to each switch can significantly reduce cost for the implementation of network 400, since switch costs can increase with the number of ports provided to the switch.

Figure 1:
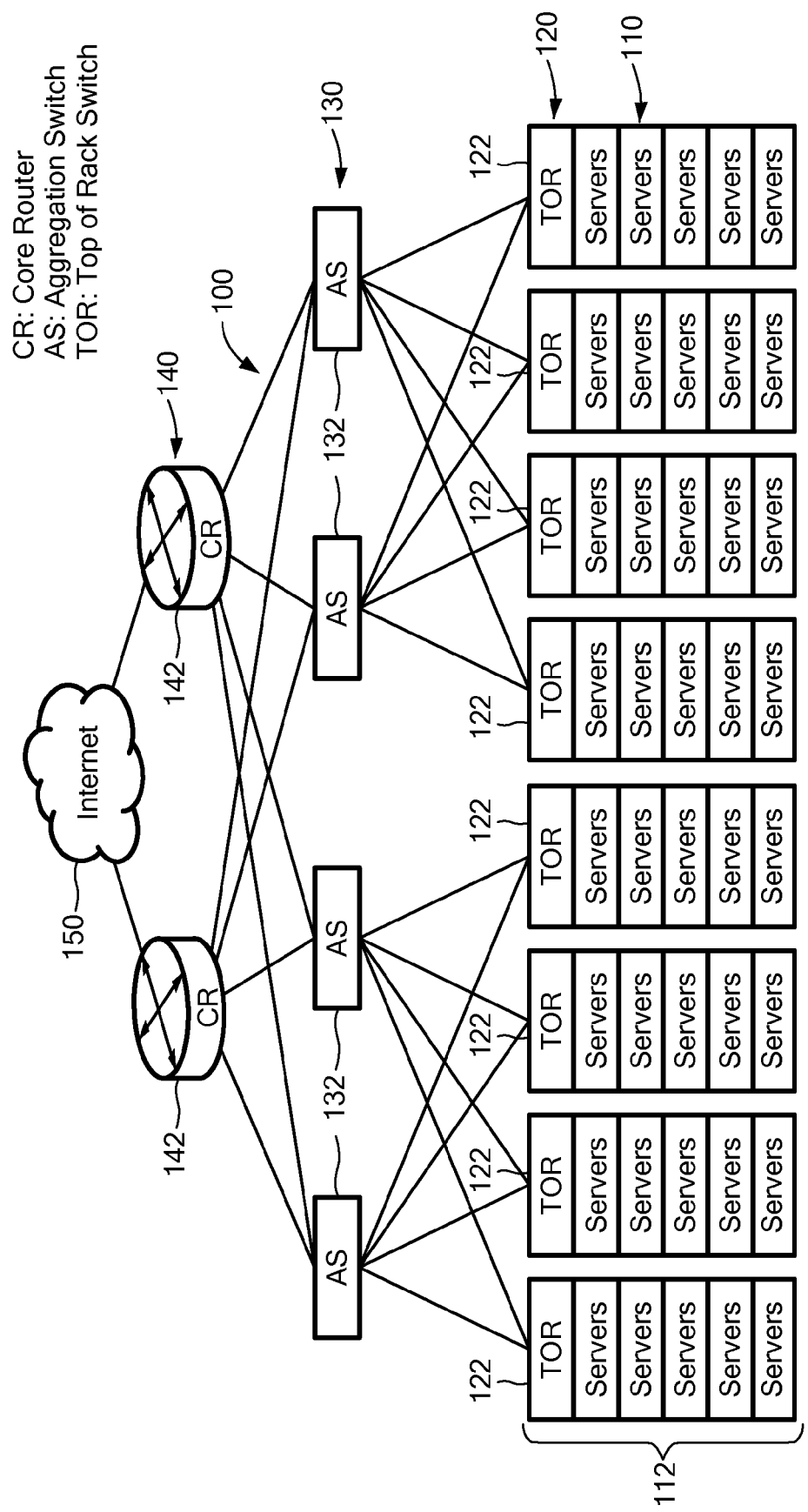
FIG. 1 is an illustration of a network organized according to a hierarchical three tier topology.
Figure 2:
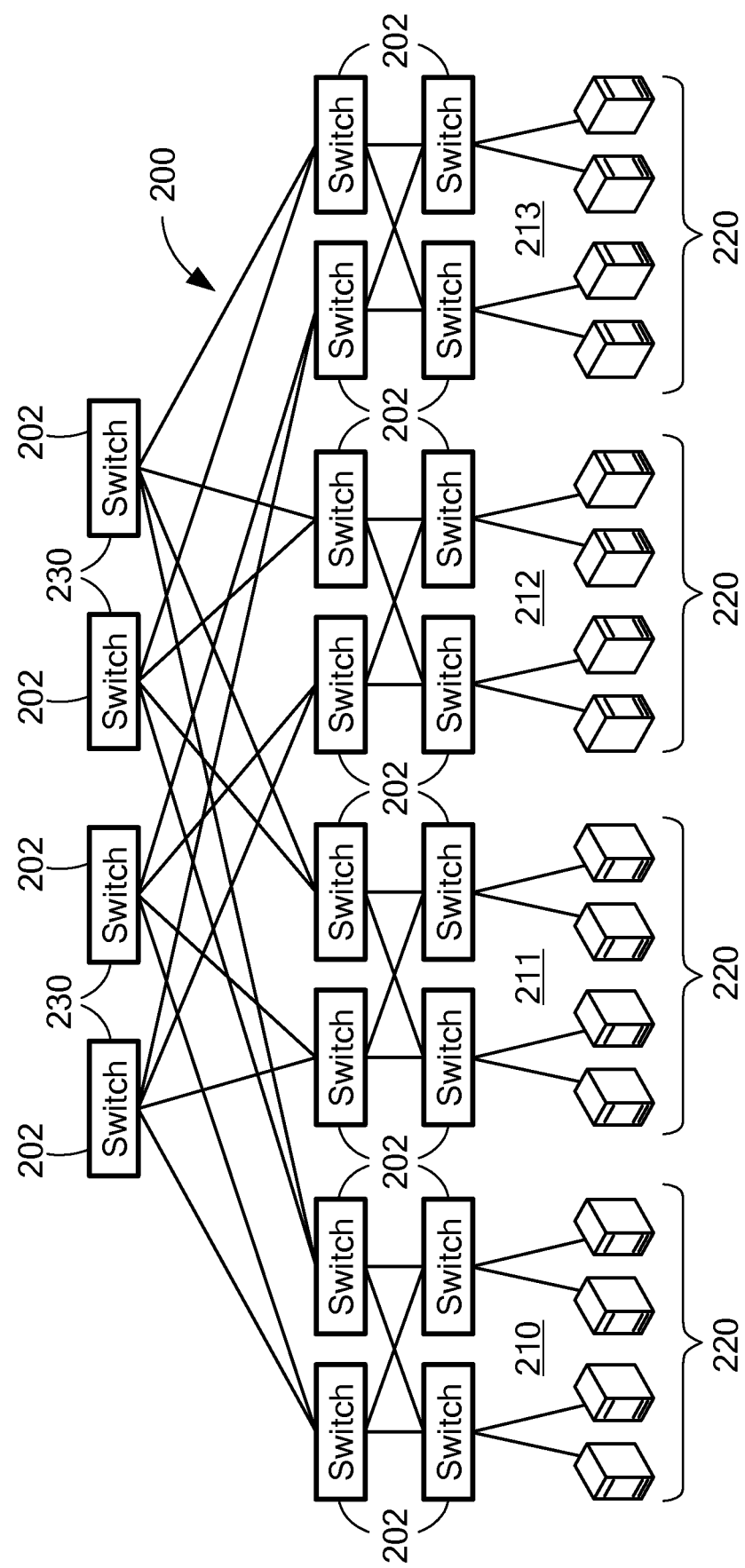
FIG. 2 is an illustration of a network organized according to a fat-tree topology.
Figure 3:
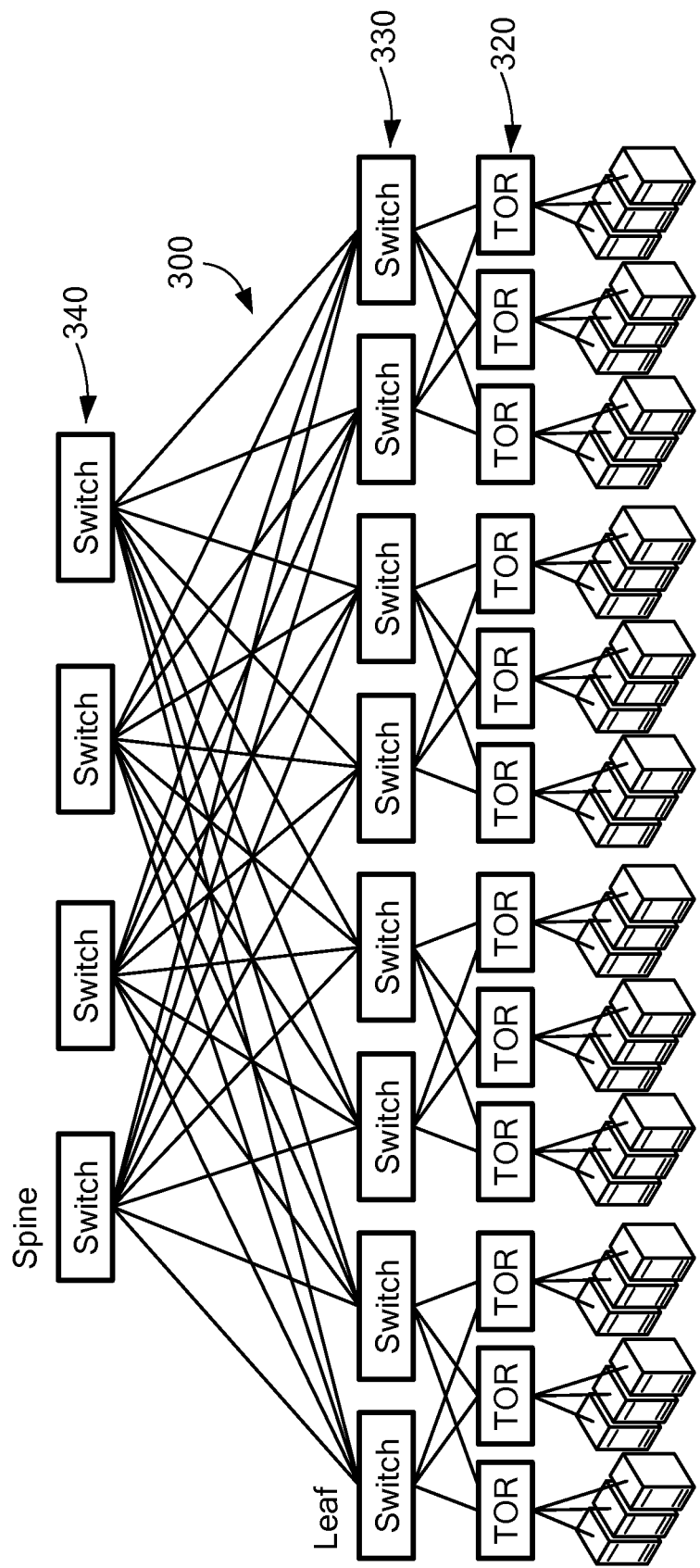
FIG. 3 is an illustration of a network organized according to a folded Clos topology.

Similarly, optical fiber interconnection methods that involve NTCU 600 can be implemented to realize other topology designs, such as the fat-tree topology of network 200 (FIG. 2) or the folded Clos topology of network 300 (FIG. 3). In addition, a number of NTCUs 600 can be deployed to scale the network and make complicated network topologies much easier to interconnect and realize.

NTCU 600 is based on optical fiber fan out and connection, and is a passive device with very low optical loss in transported signals. Accordingly NTCU 600 is highly suitable for use in a data center network, and can be easily implemented as part of an optical fiber cable patch panel management system.

Figure 7:
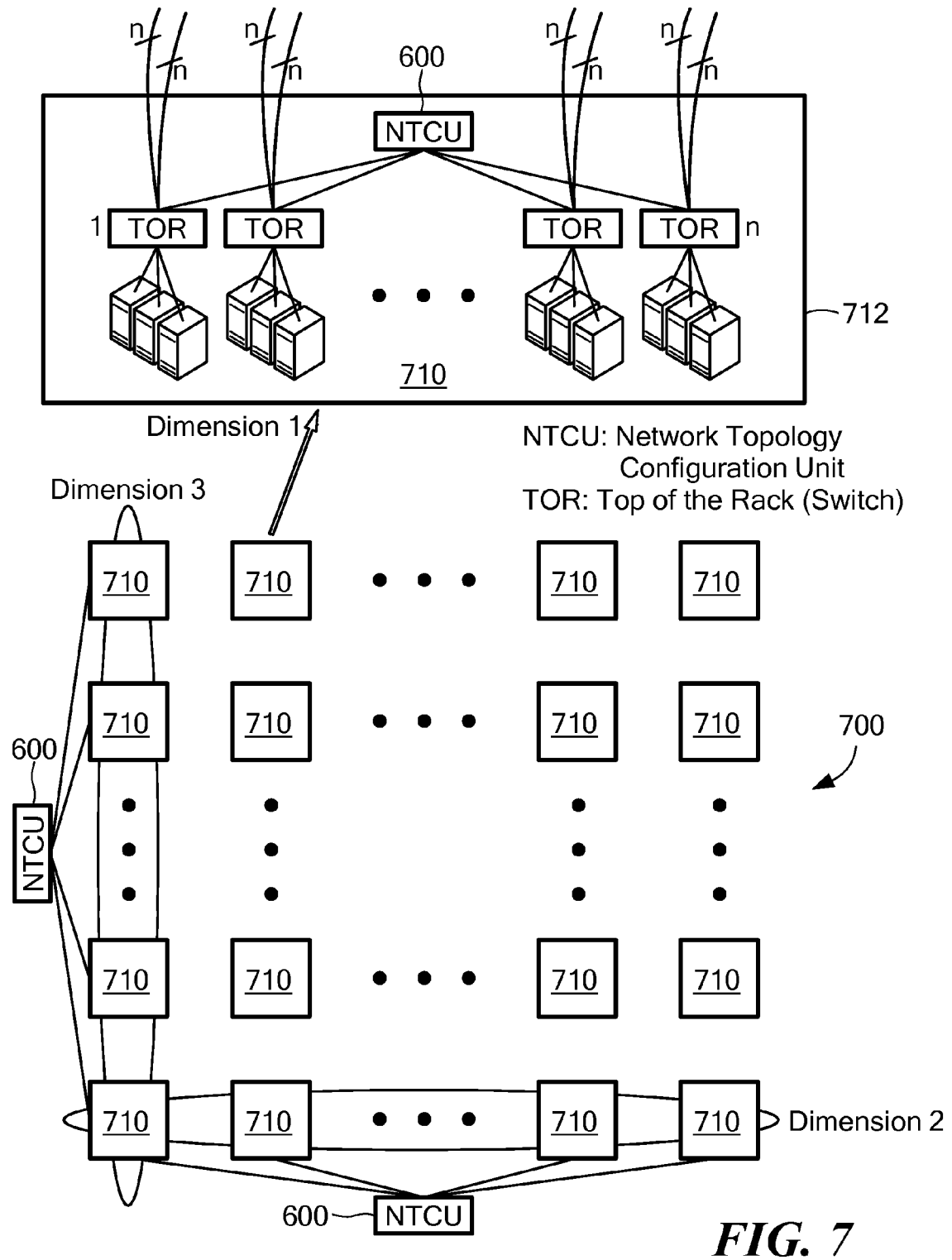
FIG. 7 is an illustration of a network organized according to a three dimension flattened butterfly topology and implemented using the device of FIG. 6 for connectivity.

Referring now to FIG. 7, multiple NTCUs 600 can be used to construct a three dimension flattened butterfly network 700. Each row and column of network 700 can have constituent switch nodes 710 connected via an NTCU 600, while each switch node can also be implemented using an NTCU 600, as illustrated in the expanded view of switch node 712. Again, cabling can be run directly from each switch to NTCUs 600, rather than running separate cables to each switch used to realize the topology, leading to reduced cost, simplified implementation and reduced connection errors. In addition, the use of NTCUs 600 enables simplified connection management, so that the already built network 700 can be more easily scaled-out in a data center environment in accordance with the desired topology. Other network arrangements can also be easily implemented in accordance with the topology illustrated in network 700, such as a torus or double torus network, e.g., a multi-dimensional meshed ring.

EXAMPLE 1

In accordance with an exemplary embodiment, NTCU 600 is used to replace 24 CWDM cables for a switch 1, and 48 CWDM cables for a switch 2, with 6 Silicon Photonic QSFP+ for switch 1 and 12 QSFP+ for switch 2. This eliminates a CWDM MUX/DMUX module, providing significant costs savings. Two 24 SM fiber MTP connectors are used to connect each of switch 1 and switch 2 to NTCU 600, and can be suitably labeled, such as "West/East." The optical cost reduction can be on the order of from one quarter to one third of the implementation cost without NTCU 600.

The above example shows the cost benefits of using NTCU 600 on the basis of reducing cable runs used to implement the network connections. In addition, the network connections can scale with 3-D, 4-D mesh for very large data center, as the 4 km reach of the lower cost fiber can cover even the largest data center. Accordingly, as a data center scales-out, more expensive fiber options need not be deployed when NTCU 600 is used to make the connections between switches. A plurality of NTCUs 600 can be deployed to realize the multidimensional topologies sometimes employed to construct a data center network. The addition of NTCUs 600 in a data center network scale-out also simplifies the connectivity and can lead to more cost effective and reliable scale-outs.

EXAMPLE 2

In accordance with the present example, two optical MTP cables are used for each switch to implement a CWDM ring solution in conjunction with the fiber shuffle device of the present disclosure. This number of optical MTP cables is twice that of a conventional ring implementation, where each switch is directly connected to a neighboring switch. However, the use of two MTP cables per switch is still manageable with regard to cost, and permits straightforward scale-out and simplified management of cabling and connectivity. For example, if it were desired to change the CWDM ring to another topology, such as a chordal ring, the connections for the new topology can be made with relative simplicity and ease at the fiber shuffle device of the present disclosure. Thus, the cables and connections can be changed at a single location, to produce a new network topology, without having to add cables, or change cable connections at the switches themselves.

While the above discussion illustrates the implementation of a fiber shuffle device with 11 ports, the present disclosure is not so limited. Indeed, any practical number of ports may be provided in the fiber shuffle device, and any number of fiber shuffle devices can be deployed together or separately, including in mixed numbers of ports, to realize a desired network topology. For example, a fiber shuffle device in accordance with the present disclosure can implement a 23 node meshed ring with 20 G to each neighbor node, and 10 G to all other nodes. This implementation can also be scaled-out to a 23×23=529 node network, with 25 k servers, using 2-D mesh, without significantly complicating cabling or connectivity, using 23 fiber shuffle devices that each has 23 ports.

The fiber shuffle device of the present disclosure thus provides a number of advantages in implementing data center topology interconnections. For example, the fiber shuffle device decouples the topology design from the physical products, enabling topology implementation to be deployed at the fiber shuffle device, rather than distributing meaningful connectivity decisions among the switches and their connections to implement a desired topology. In addition, the fiber shuffle device of the present disclosure enables different topology implementations with the same switch products. Different topologies can be readily implemented through the provisioning and configuration of connections of a low cost, passive fiber shuffle device.

The fiber shuffle device also provides more resilience than ring physical topology for the fiber cut and node failures. In particular, connectivity between non-failing nodes can be maintained without degradation if one node experiences a fiber pull out, or if the node is removed. The fiber shuffle device is very suitable for large data center design, and can be incorporated into the design at the onset, which aids the designer since it is common practice to initially design the physical topology of the network. In addition, the optical technology used is a very low cost solution for connectivity. Moreover, Silicon Photonics continue to mature, driving optical prices even lower than possible with other optical technology. For example, 4×25 G QSFP modules can be expected to be available for data center network applications in accordance with the present disclosure, at a similar or reduced price point.

The above discussion provides a description of a low cost, low signal loss, optical fiber passive unit for data center network topology configuration, and a method for such configuration. The following discussion provides an active unit and an active method that provides additional flexibility and functionality to enable network topology reconfiguration based on data center traffic demand, for example.

Figure 8:
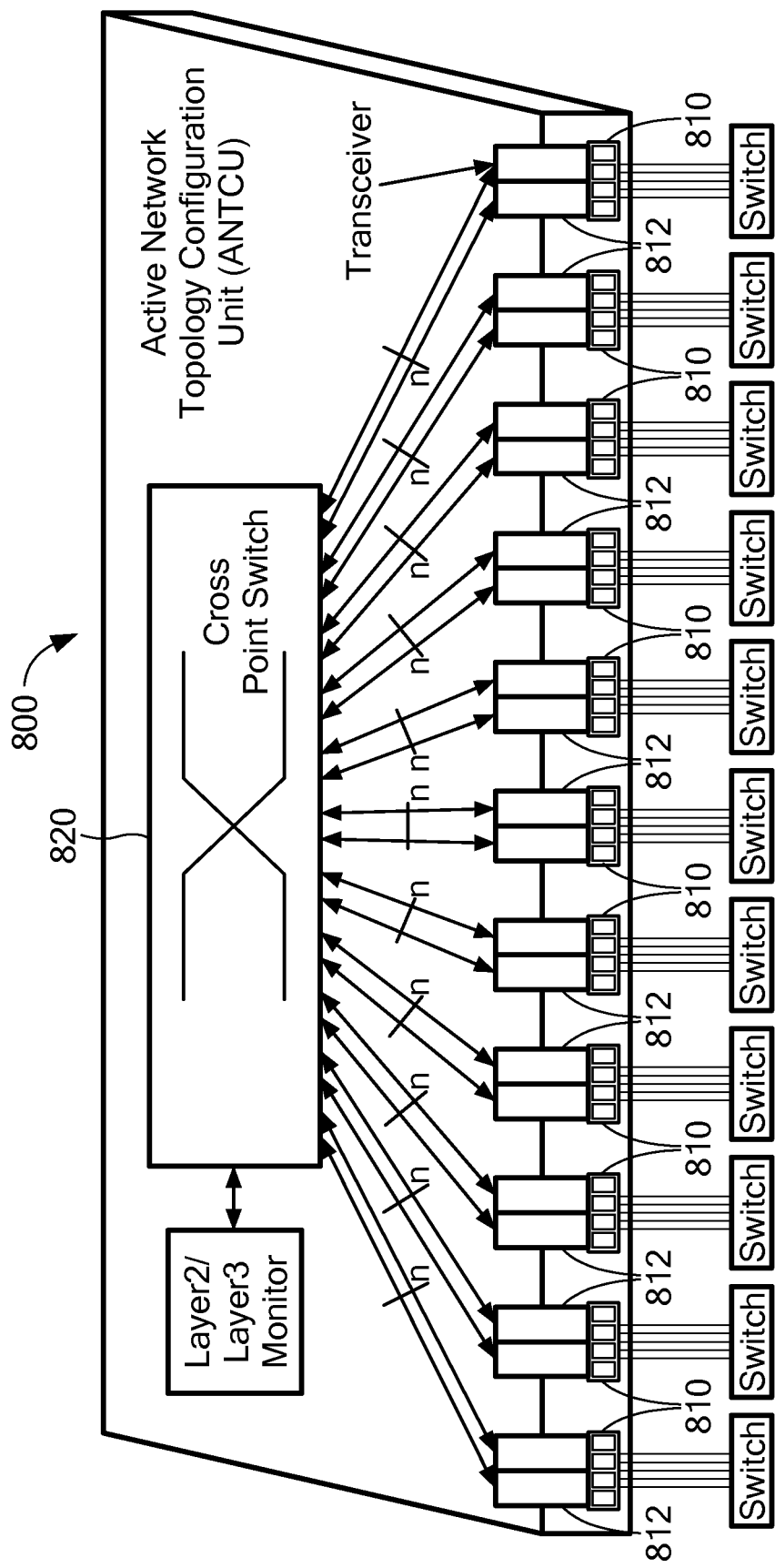
FIG. 8 is an illustration of a connectivity device in accordance with an exemplary embodiment of the present disclosure.

FIG. 8 shows an active NTCU (ANTCU) 800, that is provisioned with a cross point switch. The network interface ports of the switches and routers that are to make up the network are connected with the electric and/or optical transceivers 812 built into ANTCU 800. Transceivers 810 can be standard types such as SFP+, QSFP, CXP optical module, SFP+, QSFP, CXP direct attached cable, or active optical cable, or any standard or propriety optical/electric transceivers.

After the input, high speed optical signals are converted into electric signals via transceivers 812, they are connected with a cross point switch 820, which can make flexible interconnections to optical connectors 810 to realize arbitrary and dynamic network topologies. Cross point switch 820 can also add or substrate connections depending on, e.g., network traffic patterns, to fully optimize the total available bisectional bandwidth within the network interconnections.

ANTCU 800 can also be configured to implement network layer 2/layer 3 monitor functions through multi-casting functions that are typically available in an electric cross point switch, where a monitor port can periodical scan all the input ports, so as to automatically determine which switches and which routers are attached to which cross point switch ports. This feature can be used to implement an automatic configuration of the desired network topology, since the cross point switch can be made aware of the physical connections between attached switches and routers at the cross point ports. The cross point switch can be controlled or programmed with software or execute applications to assist in network topology management and optimization.

Figure 9:
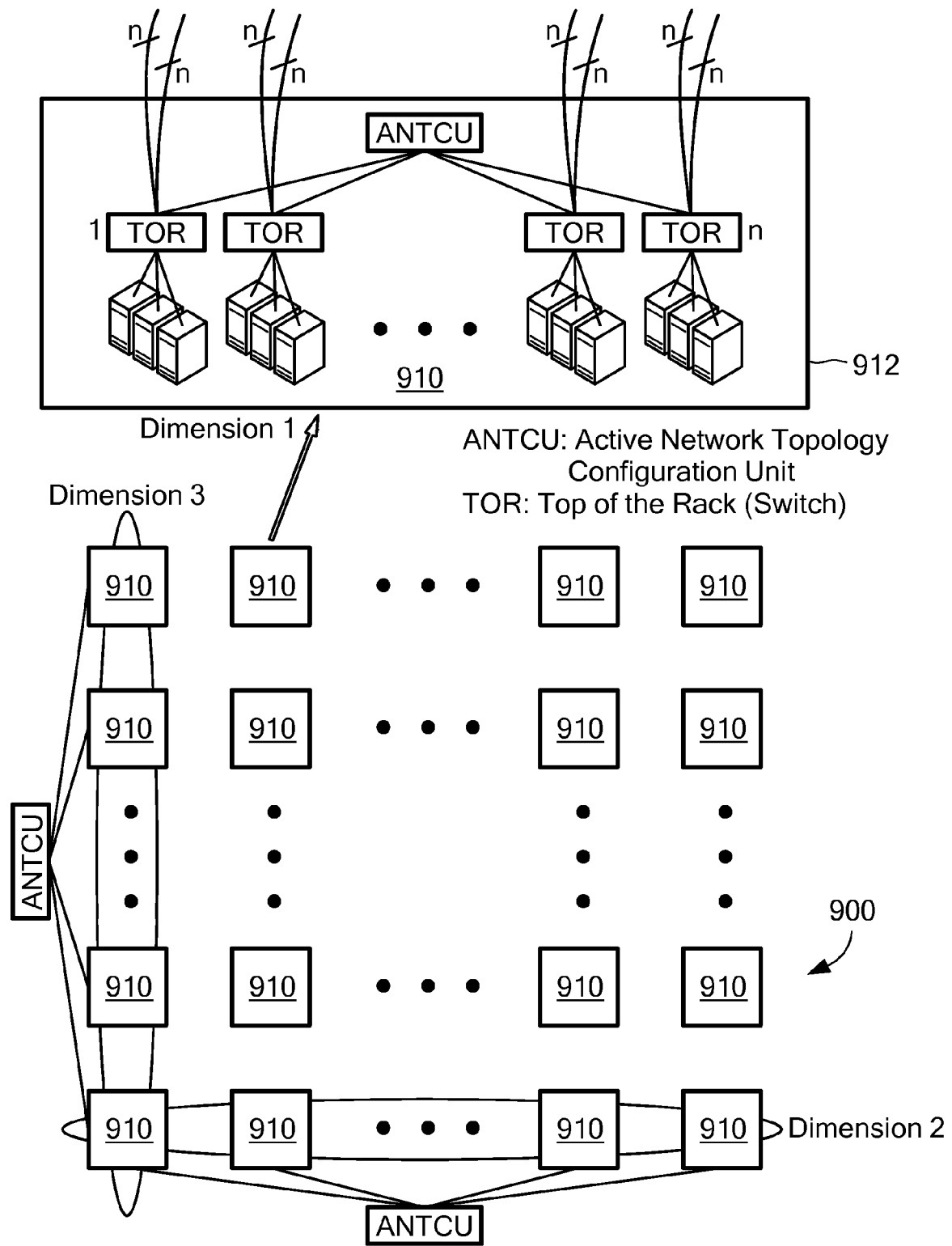
FIG. 9 is an illustration of a network organized according to a three dimension flattened butterfly topology and implemented using the device of FIG. 8 for connectivity.

As was the case with NTCU 600, one or more ANTCUs 800 can be used to interconnect switches to build networks with multidimensional topologies. Referring now to FIG. 9, multiple ANTCUs 800 can be used to construct a three dimension flattened butterfly network 900. Each row and column of network 900 can have constituent switch nodes 910 connected via an ANTCU 800, while each switch node can also be implemented using an ANTCU 800, as illustrated in the expanded view of switch node 912. Again, cabling can be run directly from each switch to ANTCUs 800, rather than running separate cables to each switch used to realized the topology, leading to simplified implementation and reduced connection errors. In addition, the use of ANTCUs 800 enables simplified connection management, so that the already built network 900 can be more easily scaled-out in a data center environment in accordance with the desired topology. Other network arrangements can also be easily implemented in accordance with the topology illustrated in network 900, such as a torus or double torus network, e.g., a multi-dimensional meshed ring. These multidimensional topologies can be constructed with one or more ANTCUs 800, and additional ANTCUs 800 can be easily added in a data center network scale-out to simplify connectivity at lower cost with greater reliability, thereby permitting faster deployment.

Figure 10:
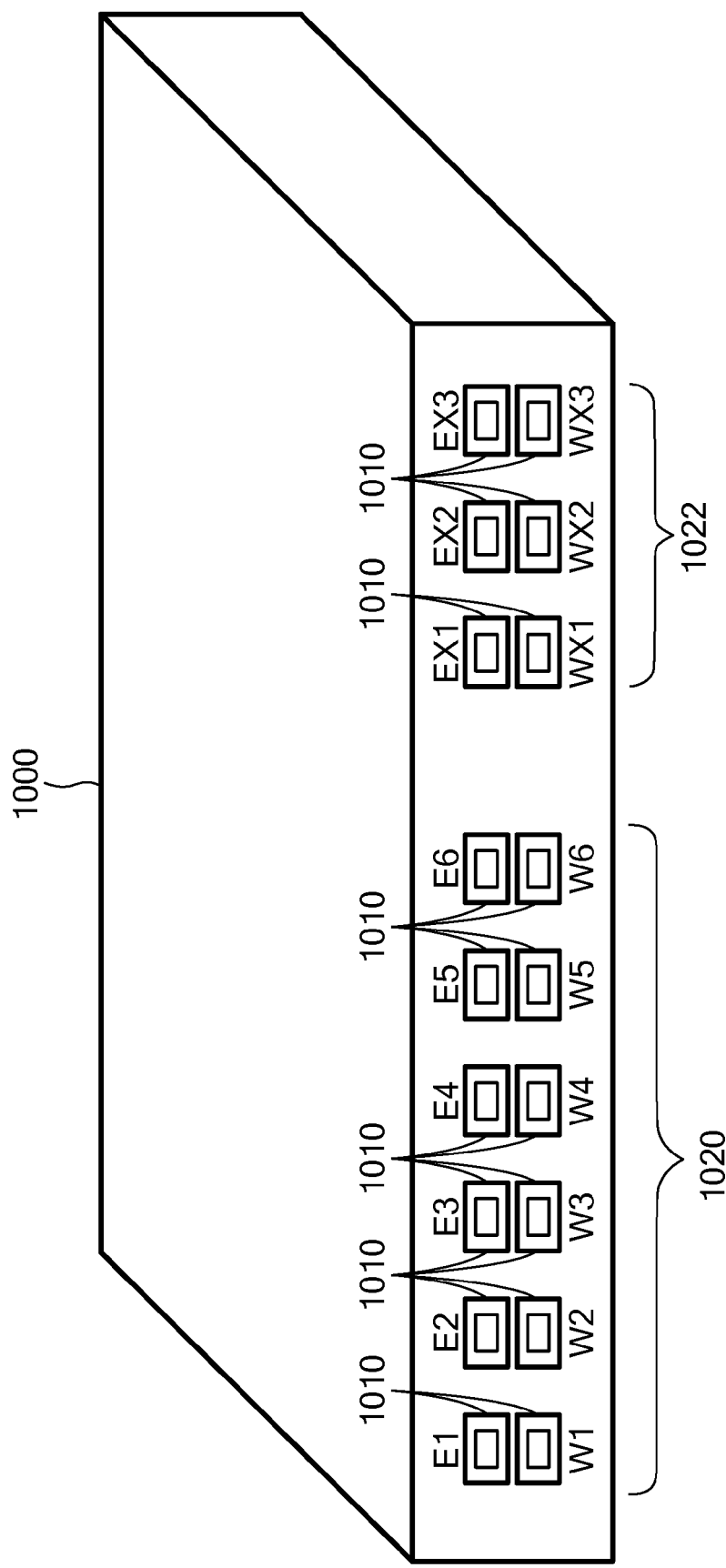
FIG. 10 is an illustration of a connectivity device in accordance with an exemplary embodiment of the present disclosure.

Referring now to FIG. 10, a shuffle box, or fiber MUX, 1000 in accordance with an exemplary embodiment of the present disclosure is illustrated. Fiber MUX 1000 includes a number of MTP connectors 1010 that can receive MTP cable connectors carrying optical fibers for connection to switches in a data center network environment. Each of connectors 1010 is provided with a label indicating east or west orientation by having a preliminary letter of E or W. Connectors 1010 are grouped into East-West sets 1020 and 1022, where set 1020 represents connectivity provided for a six node/switch network. Set 1022 represents extendable network connectivity that can be used to scale-out an existing network without significant changes in software, cabling or configuration of the previously established network.

Fiber MUX 1000 is a passive fiber 1 U device, and can accommodate MTP connectors 1010 that are provided with any number of desired fibers, including such popular fiber cabling as have 12, 24, 48 or 72 fibers. Connectors 1010 are low loss 24 SM fiber MTP connectors, for example, with a maximum loss of 0.75 dB. Connectors 1010 can be provided with a shutter that is normally closed for eye safety when making connections with MTP cables at any other connectors 1010.

Figure 11:
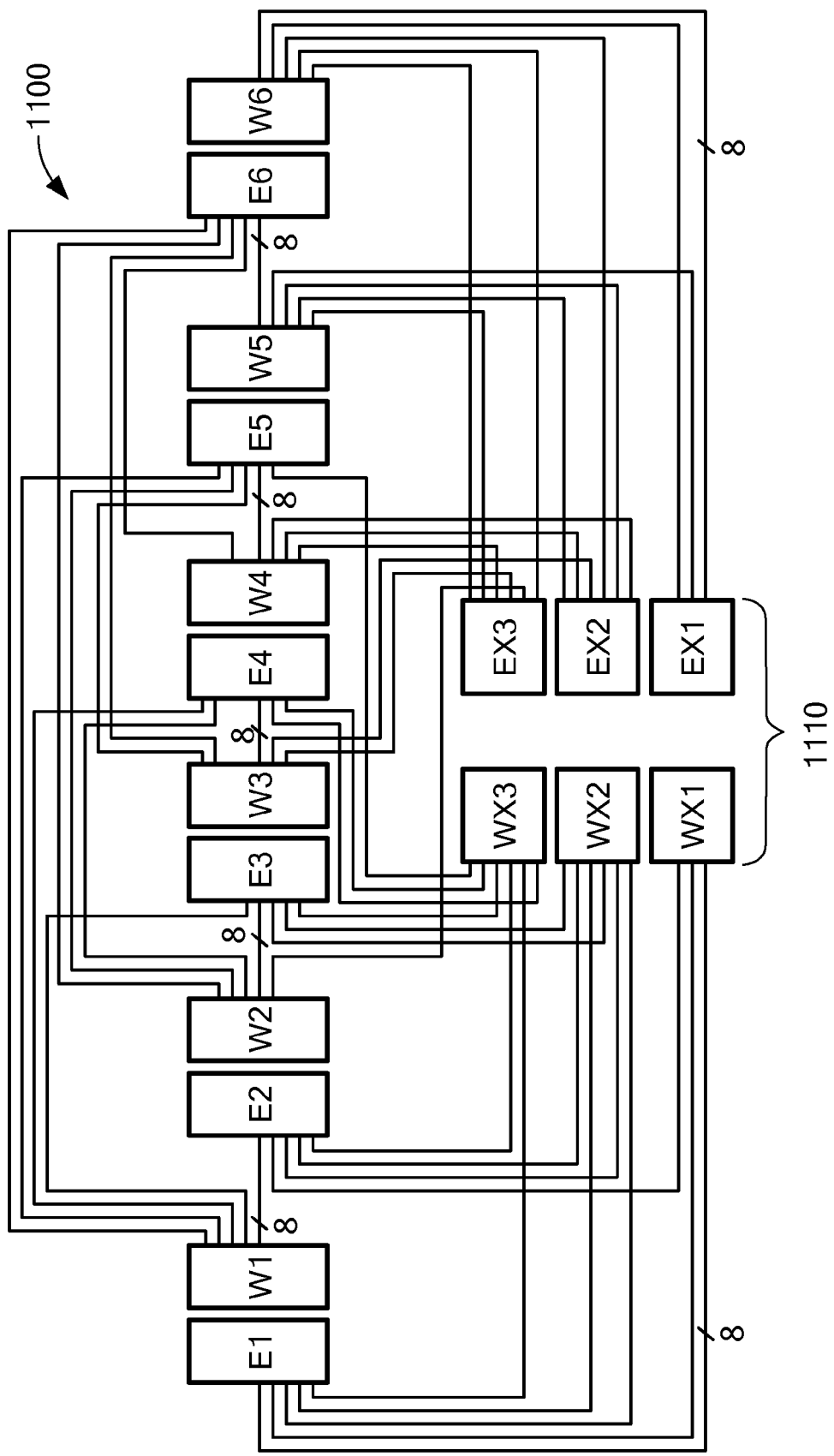
FIG. 11 is an illustration of a diagram of internal connections for the connectivity device of FIG. 10.

Referring now also to FIG. 11, a diagram of internal connections 1100 for fiber MUX 1000 is illustrated. Some of connections 1100 include eight fibers bundled together, as illustrated in FIG. 11, while the remaining fibers can be provided in groups of four.

Each of connectors 1010 can be directly cable connected to a switch in the network topology to provide connectivity with a number of other switches through connections 1100 shown in FIG. 11. Fiber MUX 1000 and connections 1100 are configured so that group 1020 can be used to implement a network with a smaller number of nodes (six) using connectors 1010, and with connectors 1010 in set 1022 being available for expansion for later network scale-out. According to an exemplary embodiment, East-West connectors 1010 in set 1022 can be jumpered together, so that EX1 is connected to WX1, EX2 is connected to WX2 and EX3 is connected to WX3, to provide direct, physical, passive fiber optic connections between those ports. In such an instance, connections 1100 provide direct, physical links between all switches connected to fiber MUX 1000 at connectors 1010 in set 1020. In such a configuration, fiber MUX 1000 behaves similarly to a small scale version of NICU 600 illustrated in FIG. 6, such as by having connections available to construct a 6 switch network in a physical ring mesh topology, for example. With such a configuration, pairs of east-west connectors 1010, for example, E1 and W1; E2 and W2; E3 and W3; E4 and W4; E5 and W5; and E6 and W6, are each directly connected to a switch in the six switch ring mesh.

If it is desired to scale-out such a six switch network implemented with fiber MUX 1000, the jumpers in the East-West connectors 1010 of set 1022 are removed to permit connections to be made to new, additional switches. Such connections can be made with an additional fiber MUX 1000 to further simplify the additional cabling and connectivity for the new, additional switches.

It should be appreciated that while fiber MUX 1000 illustrates 18 connectors 1010, any number of connectors 1010 can be provided, and grouped in any particular number of groups. Accordingly, while set 1020 of fiber MUX 1000 is configured for six switches, any number could be provided, including multiples of six. For example, the twelve illustrated in set 1020 can be used, as well as other numbers or multiples of six, such as 18, 24 or 6. The number of connectors 1010 that can be provided as part of a base group, represented in FIG. 10 as set 1020, are therefore not to be viewed as limited. Similarly, set 1022 can be composed of any number of connectors 1010, including such multiples of six, such as the six illustrated in set 1022, or 12, 18 or 24 connectors, for example.

According to an exemplary embodiment, the number of connectors 1010 in fiber MUX 1000 is constrained to avoid exceeding a budget for losses due to connections for optical fibers. For example, each connection can have losses of about 0.75 dB, so that a maximum of six connections is provided in accordance with this exemplary embodiment for deploying fiber MUX 1000.

Figure 12:
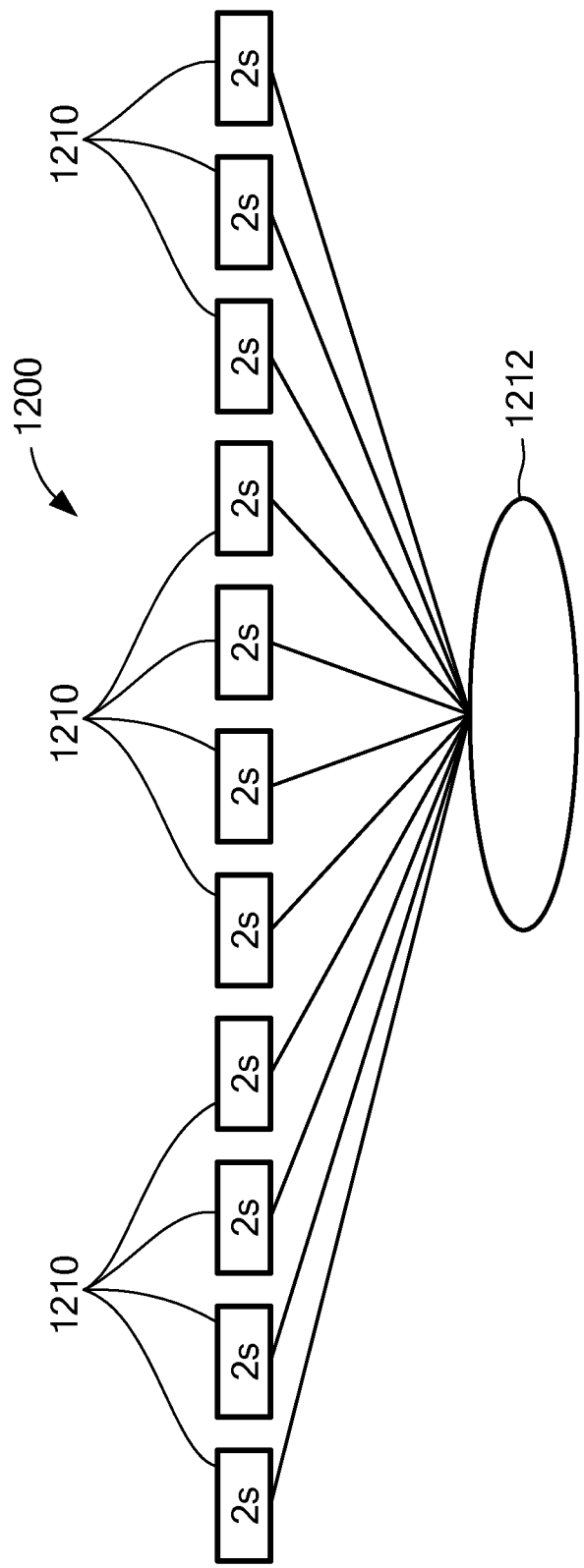
FIG. 12 is an illustration of connectivity in a physical network topology.

Referring now to FIG. 12, a physical network connection topology 1200 is illustrated. Each of level 2 switches 1210 are directly connected to a fiber MUX 1212, with connections that can be configured according to a desired logical topology, including a ring mesh or chordal ring. In topology 1200, fiber MUX 1212 can be configured as a single device with 22 MTP ports, e.g., 11 east-west ports to connect with each of switches 1210. Alternately, several fiber MUX's 1000 can be used to implement fiber MUX 1212, with set 1022 being used to connect to a second fiber MUX 1000 to permit the six switch connectivity of fiber MUX 1000 to be scaled-out to 11 switches, as illustrated in FIG. 12. In this way, it should be clear that fiber MUX 1000 or 1212 permits networks to be constructed to be upgradeable, such as by increasing a chordal ring diameter, to thus expand the network with simple connectivity implementations.

Figure 13:
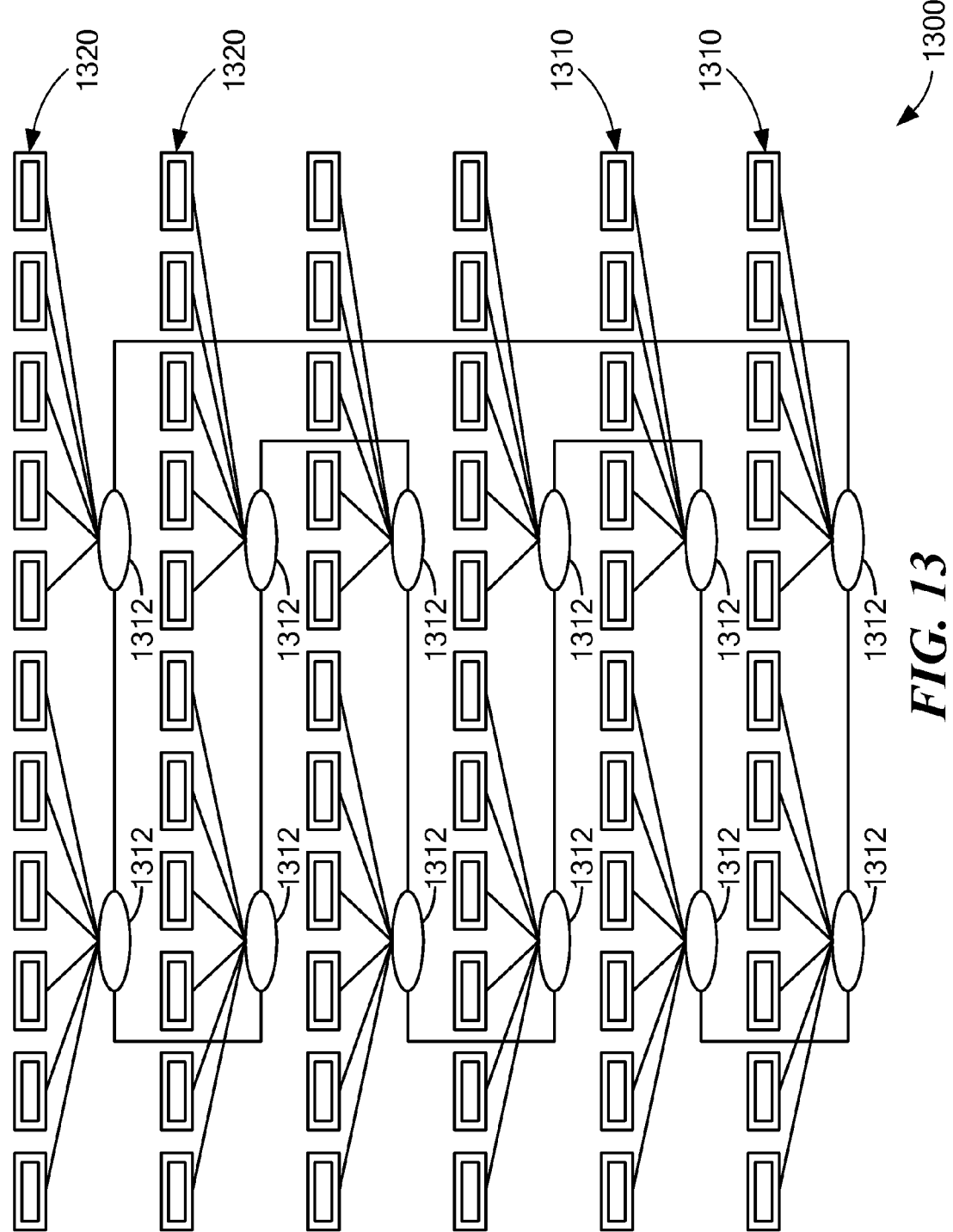
FIG. 13 is an illustration of a multi-row ring network topology using fiber shuffle devices according to an exemplary embodiment of the present disclosure.

Referring now to FIG. 13, a large ring topology 1300 illustrates the use of multiple fiber MUX's 1312 to implement large scale connectivity to permit construction of various large scale logical topologies, such as ring meshes, chordal rings, flattened butterfly topologies and so forth. Fiber MUX's 1312 are chained together to form a single larger ring. In topology 1300, each switch 1310, shown as being organized in rows 1320, can communicate with any other switch using fiber MUX's 1312 with a maximum hop count of six. Fiber MUX's 1312 are relatively inexpensive in comparison with switches and cabling costs, so that the significantly increased connectivity available through fiber MUX's 1312 provides significant cost savings in implementing such a large scale network as is illustrated with topology 1300.

The details of internal fiber connections 1100 are provided in Tables 1-6 below. The labeling convention used is: E1_1 means fiber #1 in connector marked as E1. In each of Tables 1-6, each of the first two columns and the last two columns in a given row identify connector endpoints of respective fibers that are connected internally. For example, the first row of Table 1 indicates internal connections made between the fiber #1 location of connector E1 and the fiber #13 location of connector WX1, and between the fiber #1 location of connector W1 and the fiber #13 location of connector E2.

TABLE 1

| E1_1 | WX1_13 | W1_1 | E2_13 |
|---|---|---|---|
| E1_2 | WX1_14 | W1_2 | E2_14 |
| E1_3 | WX1_15 | W1_3 | E2_15 |
| E1_4 | WX1_16 | W1_4 | E2_16 |
| E1_5 | WX1_17 | W1_5 | E3_17 |
| E1_6 | WX1_18 | W1_6 | E3_18 |
| E1_7 | WX2_13 | W1_7 | E4_19 |
| E1_8 | WX2_14 | W1_8 | E4_20 |
| E1_9 | WX2_19 | W1_9 | E5_21 |
| E1_10 | WX2_20 | W1_10 | E2_22 |
| E1_11 | WX3_15 | W1_11 | E6_23 |
| E1_12 | WX3_16 | W1_12 | E6_24 |
| E1_13 | WX1_1 | W1_13 | E2_1 |
| E1_14 | WX1_2 | W1_14 | E2_2 |
| E1_15 | WX1_3 | W1_15 | E2_3 |
| E1_16 | WX1_4 | W1_16 | E2_4 |
| E1_17 | WX1_5 | W1_17 | E3_5 |
| E1_18 | WX1_6 | W1_18 | E3_6 |
| E1_19 | WX2_1 | W1_19 | E4_7 |
| E1_20 | WX2_2 | W1_20 | E4_8 |
| E1_21 | WX2_7 | W1_21 | E5_9 |
| E1_22 | WX2_8 | W1_22 | E5_10 |
| E1_23 | WX3_3 | W1_23 | E6_11 |
| E1_24 | WX3_4 | W1_24 | E6_12 |

TABLE 2

| E2_1 | W1_13 | W2_1 | E3_13 |
|---|---|---|---|
| E2_2 | W1_14 | W2_2 | E3_14 |
| E2_3 | W1_15 | W2_3 | E3_15 |
| E2_4 | W1_16 | W2_4 | E3_16 |
| E2_5 | WX1_19 | W2_5 | E4_17 |
| E2_6 | WX1_20 | W2_6 | E4_18 |
| E2_7 | WX2_15 | W2_7 | E5_19 |
| E2_8 | WX2_16 | W2_8 | E5_20 |
| E2_9 | WX2_21 | W2_9 | E6_21 |
| E2_10 | WX2_22 | W2_10 | E6_22 |
| E2_11 | WX3_17 | W2_11 | EX3_15 |

TABLE 2-continued

| E2_12 | WX3_18 | W2_12 | EX3_16 |
|---|---|---|---|
| E2_13 | W1_1 | W2_13 | E3_1 |
| E2_14 | W1_2 | W2_14 | E3_2 |
| E2_15 | W1_3 | W2_15 | E3_3 |
| E2_16 | W1_4 | W2_16 | E3_4 |
| E2_17 | WX1_7 | W2_17 | E4_5 |
| E2_18 | WX1_8 | W2_18 | E4_6 |
| E2_19 | WX2_3 | W2_19 | E5_7 |
| E2_20 | WX2_4 | W2_20 | E5_8 |
| E2_21 | WX2_9 | W2_21 | E6_9 |
| E2_22 | WX2_10 | W2_22 | E6_10 |
| E2_23 | WX3_5 | W2_23 | EX3_3 |
| E2_24 | WX3_6 | W2_24 | EX3_4 |

TABLE 3

| E3_1 | W2_13 | W3_1 | E4_13 |
|---|---|---|---|
| E3_2 | W2_14 | W3_2 | E4_14 |
| E3_3 | W2_15 | W3_3 | E4_15 |
| E3_4 | W2_16 | W3_4 | E4_16 |
| E3_5 | W1_17 | W3_5 | E5_17 |
| E3_6 | W1_18 | W3_6 | E5_18 |
| E3_7 | WX2_17 | W3_7 | E6_19 |
| E3_8 | WX2_18 | W3_8 | E6_20 |
| E3_9 | WX2_23 | W3_9 | EX2_19 |
| E3_10 | WX2_24 | W3_10 | EX2_20 |
| E3_11 | WX3_19 | W3_11 | EX3_17 |
| E3_12 | WX3_20 | W3_12 | EX3_18 |
| E3_13 | W2_1 | W3_13 | E4_1 |
| E3_14 | W2_2 | W3_14 | E4_2 |
| E3_15 | W2_3 | W3_15 | E4_3 |
| E3_16 | W3_4 | W3_16 | E4_4 |
| E3_17 | W1_5 | W3_17 | E5_5 |
| E3_18 | W1_6 | W3_18 | E5_6 |
| E3_19 | WX2_5 | W3_19 | E6_7 |
| E3_20 | WX2_6 | W3_20 | E6_8 |
| E3_21 | WX2_11 | W3_21 | EX2_7 |
| E3_22 | WX2_12 | W3_22 | EX2_8 |
| E3_23 | WX3_7 | W3_23 | EX3_5 |
| E3_24 | WX3_8 | W3_24 | EX3_6 |

TABLE 4

| E4_1 | W3_13 | W4_1 | E5_13 |
|---|---|---|---|
| E4_2 | W3_14 | W4_2 | E5_14 |
| E4_3 | W3_15 | W4_3 | E5_15 |
| E4_4 | W3_16 | W4_4 | E5_16 |
| E4_5 | W2_17 | W4_5 | E6_17 |
| E4_6 | W2_18 | W4_6 | E6_18 |
| E4_7 | W1_19 | W4_7 | EX2_13 |
| E4_8 | W1_20 | W4_8 | EX2_14 |
| E4_9 | WX3_13 | W4_9 | EX2_21 |
| E4_10 | WX3_14 | W4_10 | EX2_22 |
| E4_11 | WX3_21 | W4_11 | EX3_19 |
| E4_12 | WX3_22 | W4_12 | EX3_20 |
| E4_13 | W3_1 | W4_13 | E5_1 |
| E4_14 | W3_2 | W4_14 | E5_2 |
| E4_15 | W3_3 | W4_15 | E5_3 |
| E4_16 | W3_4 | W4_16 | E5_4 |
| E4_17 | W2_5 | W4_17 | E6_5 |
| E4_18 | W2_6 | W4_18 | E6_6 |
| E4_19 | W1_7 | W4_19 | EX2_1 |
| E4_20 | W1_8 | W4_20 | EX2_2 |
| E4_21 | WX3_1 | W4_21 | EX2_9 |
| E4_22 | WX3_2 | W4_22 | EX2_10 |
| E4_23 | WX3_9 | W4_23 | EX3_7 |
| E4_24 | WX3_10 | W4_24 | EX3_8 |

TABLE 5

| E5_1 | W4_13 | W5_1 | E6_13 |
|---|---|---|---|
| E5_2 | W4_14 | W5_2 | E6_14 |
| E5_3 | W4_15 | W5_3 | E6_15 |

TABLE 5-continued

| | | | |
|---|---|---|---|
| E5_4 | W4_16 | W5_4 | E6_16 |
| E5_5 | W3_17 | W5_5 | EX1_17 |
| E5_6 | W3_18 | W5_6 | EX1_18 |
| E5_7 | W2_19 | W5_7 | EX2_15 |
| E5_8 | W2_20 | W5_8 | EX2_16 |
| E5_9 | W1_21 | W5_9 | EX2_23 |
| E5_10 | W1_22 | W5_10 | EX2_24 |
| E5_11 | WX3_23 | W5_11 | EX3_21 |
| E5_12 | WX3_24 | W5_12 | EX3_22 |
| E5_13 | W4_1 | W5_13 | E6_1 |
| E5_14 | W4_2 | W5_14 | E6_2 |
| E5_15 | W4_3 | W5_15 | E6_3 |
| E5_16 | W4_4 | W5_16 | E6_4 |
| E5_17 | W3_5 | W5_17 | EX1_5 |
| E5_18 | W3_6 | W5_18 | EX1_6 |
| E5_19 | W2_7 | W5_19 | EX2_3 |
| E5_20 | W2_8 | W5_20 | EX2_4 |
| E5_21 | W1_9 | W5_21 | EX2_11 |
| E5_22 | W1_10 | W5_22 | EX2_12 |
| E5_23 | WX3_11 | W5_23 | EX3_9 |
| E5_24 | WX3_12 | W5_24 | EX3_10 |

TABLE 6

| | | | |
|---|---|---|---|
| E6_1 | W5_13 | W6_1 | EX1_13 |
| E6_2 | W5_14 | W6_2 | EX1_14 |
| E6_3 | W5_15 | W6_3 | EX1_15 |
| E6_4 | W5_16 | W6_4 | EX1_16 |
| E6_5 | W4_17 | W6_5 | EX1_19 |
| E6_6 | W4_18 | W6_6 | EX1_20 |
| E6_7 | W3_19 | W6_7 | EX2_17 |
| E6_8 | W3_20 | W6_8 | EX2_18 |
| E6_9 | W2_21 | W6_9 | EX3_13 |
| E6_10 | W2_22 | W6_10 | EX3_14 |
| E6_11 | W1_23 | W6_11 | EX3_23 |
| E6_12 | W1_24 | W6_12 | EX3_24 |
| E6_13 | W5_1 | W6_13 | EX1_1 |
| E6_14 | W5_2 | W6_14 | EX1_2 |
| E6_15 | W5_3 | W6_15 | EX1_3 |
| E6_16 | W5_4 | W6_16 | EX1_4 |
| E6_17 | W4_5 | W6_17 | EX1_7 |
| E6_18 | W4_6 | W6_18 | EX1_8 |
| E6_19 | W3_7 | W6_19 | EX2_5 |
| E6_20 | W3_8 | W6_20 | EX2_6 |
| E6_21 | W2_9 | W6_21 | EX3_1 |
| E6_22 | W2_10 | W6_22 | EX3_2 |
| E6_23 | W1_11 | W6_23 | EX3_11 |
| E6_24 | W1_12 | W6_24 | EX3_12 |

Figure 14:
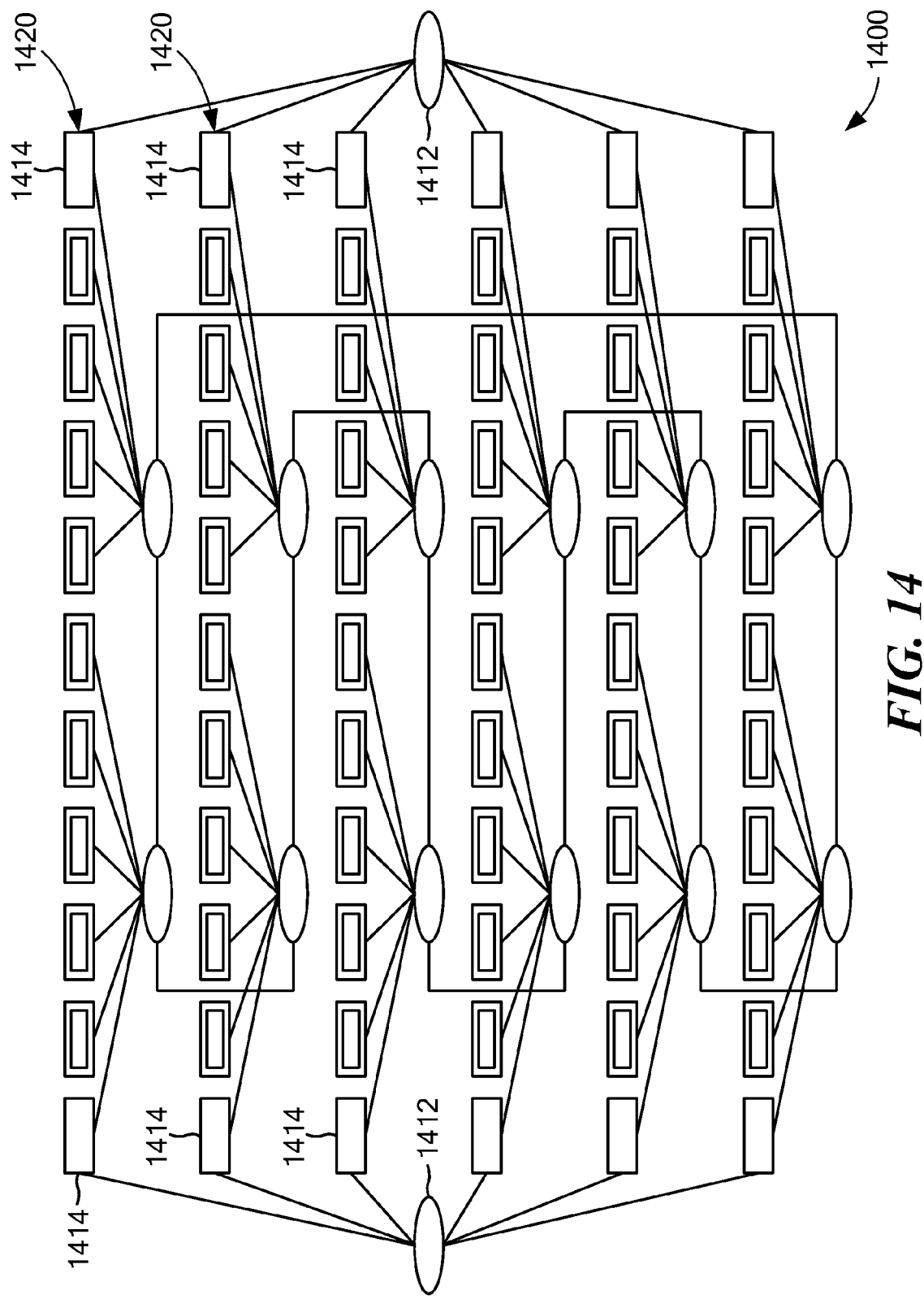
FIG. 14 is an illustration of a multi-row ring network topology using end-connected fiber shuffle devices according to an exemplary embodiment of the present disclosure.
Figure 15:
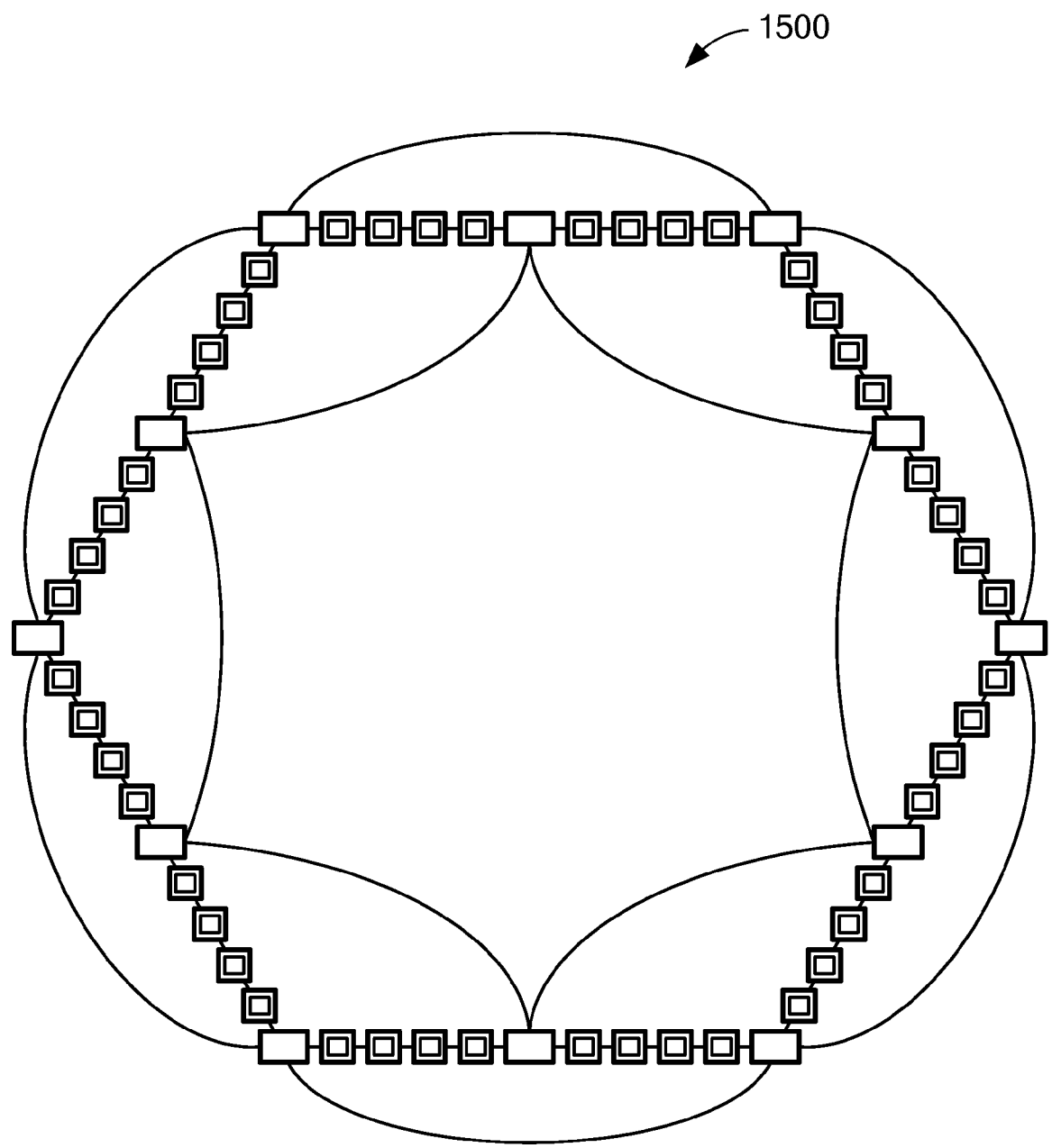
FIG. 15 is an illustration a logical topology of the network topology of FIG. 14.

Referring now to FIG. 14, a physical connectivity topology 1400 is illustrated. The configuration of topology 1400 is similar to that of 1300 shown in FIG. 13, with additional fiber MUX's 1412 connected to switches 1414, which represent ends of switch arrays that form rows 1420. The physical layout of topology 1400 is that of interconnected chordal rings and is denser than the physical layout of topology 1300, and is shown with a logical, overall chordal ring topology 1500 in FIG. 15. Topology 1400 has an improved multi-row bandwidth and hop count over topology 1300 with the addition of multi-degree switches 1414 that provide a separate bypass ring. The configuration of topology 1400 increases the bisectional bandwidth, and can readily be further extended or expanded (scaled-out) with additional fiber MUX's 1412. Logical topology 1500 illustrated in FIG. 15 shows the implementation of multi-dimensional rings, which permit software to evolve to take advantage of the increased connectivity, which connectivity can be obtained using fiber MUX 1412 with reduced complexity and cost.

Fiber MUX's 1000, 1100, 1212, 1312 and 1412 provide a number of advantages in implementing complex topologies with reduced connectivity complexity and reduced costs. For example, fiber MUX 1000 (FIG. 10) can be introduced into a six-switch ring with little software effort while providing a full range of capabilities, including East-West configuration conventions, improved switch failure domains and avoiding switch transit traffic. The fiber MUX permits reduced capacity requirements in the spine of a spine-leaf arrangement, while still providing a large bisectional bandwidth, and permitting expansion to multidimensional rings due to use of software, e.g. without requiring physical connection reconfiguration.

As an example of capability of topologies 1300 and 1400, topology 1300 can be implemented with a worst case scenario of six intermediate hops, 4,608 access ports, a bisectional bandwidth of 1.3 Tbit/sec, while topology 1400 can be implemented to have two intermediate hops as a worst case, with 4,464 access ports and a bisectional bandwidth of 2.8 Tbit/sec. The fiber MUX permits the implementation of a low cost V-spine architecture that can be implemented on a modular basis to permit scale-out with limited cost and complexity.

Figure 16:
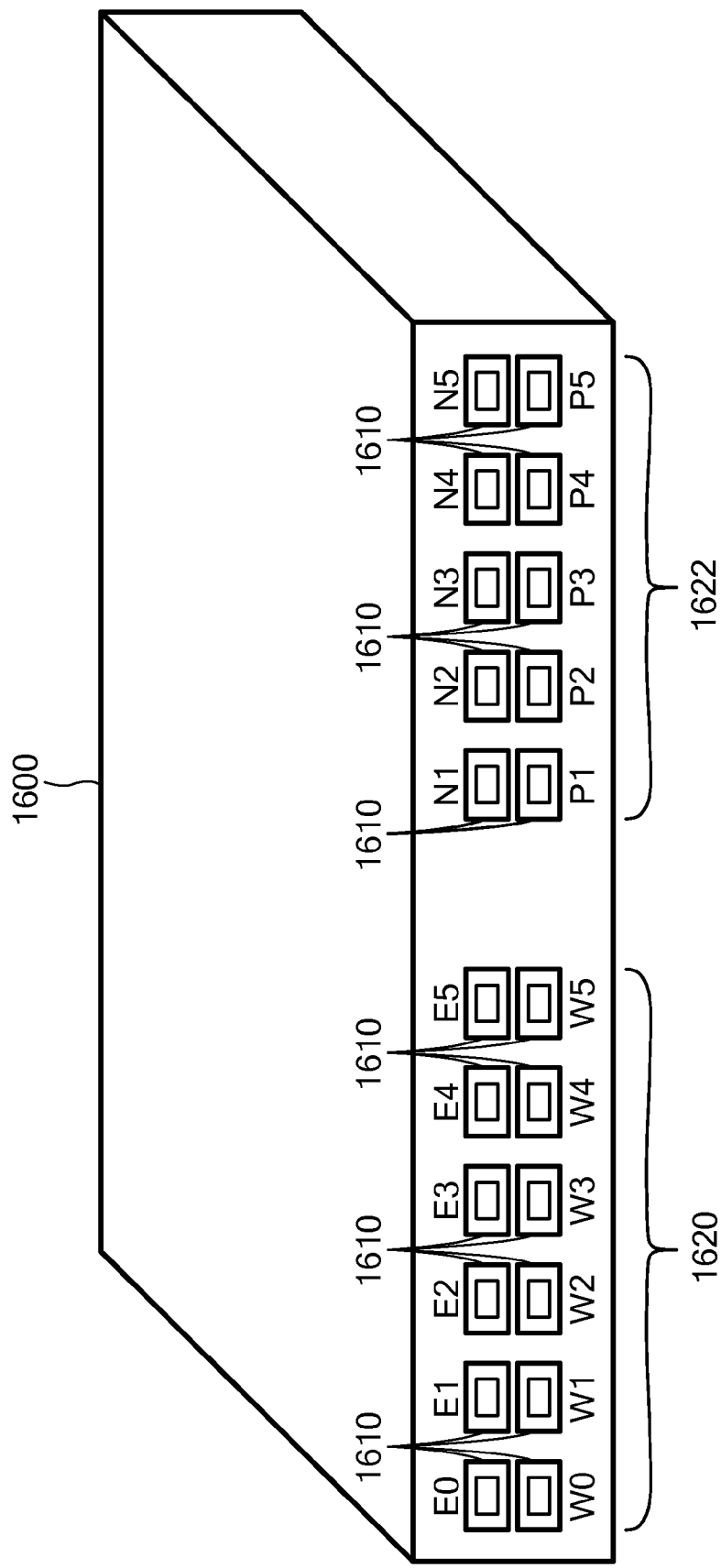
FIG. 16 is an is an illustration of a connectivity device in accordance with an exemplary embodiment of the present disclosure.

Referring now to FIG. 16, a fiber MUX or Shuffle Box (SB) 1600 in accordance with an exemplary embodiment of the present disclosure is illustrated. SB 1600 includes a number of MTP receptacle connectors 1610 that can receive MTP plug connectors carrying optical fibers for connection to switches in a data center network environment. Each of connectors 1610 is provided with a label indicating east/west orientation or next/previous orientation by having a respective preliminary letter of E or W or N or P. Connectors 1610 are grouped into East/West set 1620 and Next/Previous set 1622. Often, a number of connectors 1610 in East/West set 1620 are directly connected to network nodes, while connectors 1610 in Next/Previous set 1622 are often connected to other connectors 1610 in the same or another SB 1600. However, depending on the configuration of the network, connectors 1610 in East/West set 1620 are sometimes connected to other connectors 1610 on the same SB 1600, as discussed in greater detail below with respect to FIG. 17, for example.

Figure 18:
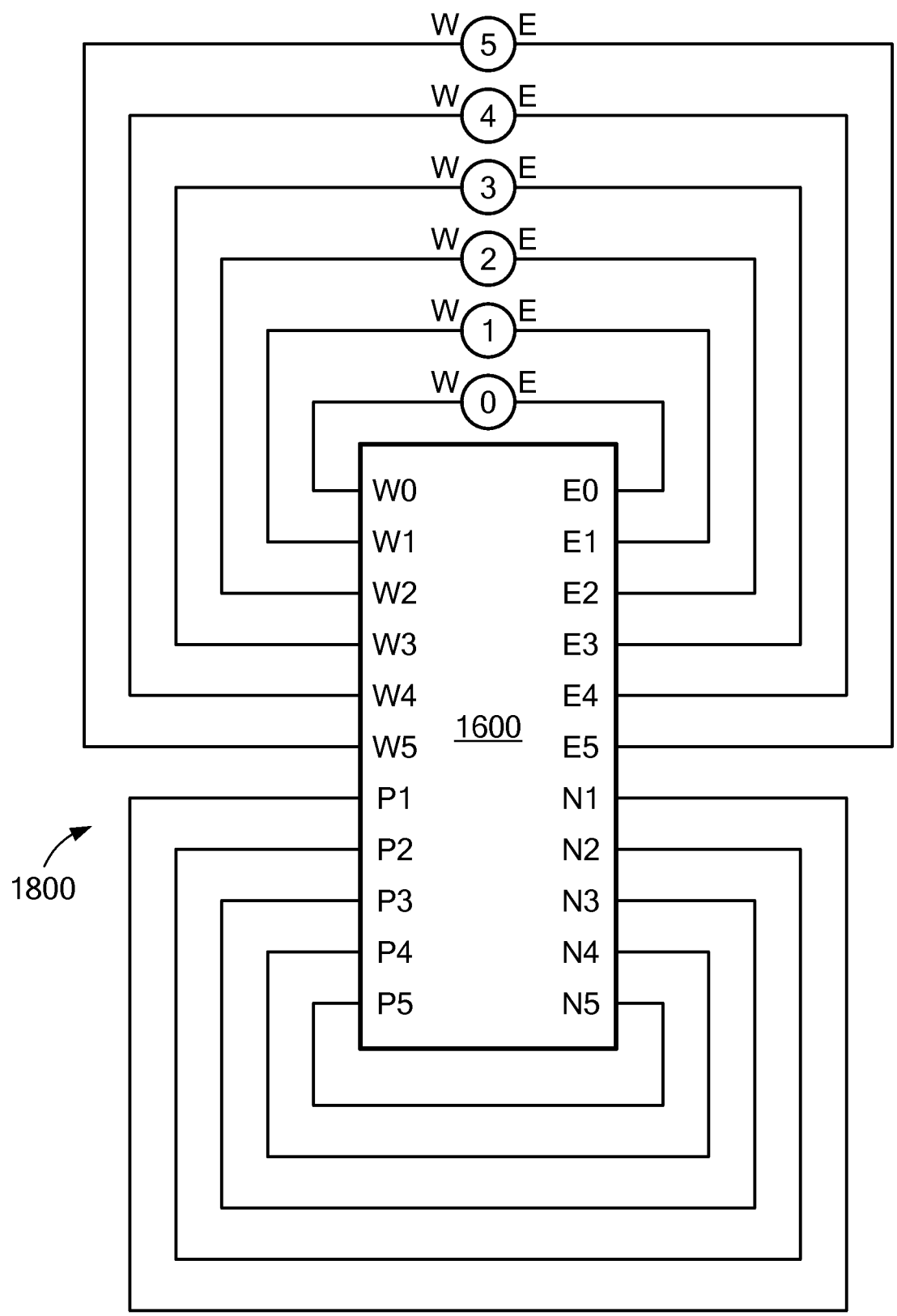

SB 1600 has internal connections that are configured to provide optical pathways between certain ones of connectors 1610. The internal connection configuration or wiring map, along with the number of pairs of connectors 1610 in Next/Previous set 1622 contributes to determining how one or more SBs 1600 are connected to implement a given topology. For example, in the case of SB 1600 illustrated in FIG. 16, all the connectors 1610 of one SB 1600 can be populated to implement a six node chordal ring, such as is illustrated in FIG. 18 and described in greater detail below.

SB 1600 is a passive fiber 1 U device, and can accommodate MTP connectors 1610 that are provided with any number of desired fibers, including such popular fiber cables that have 12, 24, 48 or 72 fibers each. Connectors 1610 are low loss 24 SM fiber MTP connectors, for example, with a maximum loss of 0.75 dB. Connectors 1610 can be provided with a shutter that is normally closed for eye safety when making connections with MTP cables at any other connectors 1610.

SB 1600 provides the capacity for implementing various network topologies with a variable number of nodes. In some embodiments, a network topology using SB 1600 leaves some of connectors 1610 unpopulated. When a component or physical network implementation provides capacity that is unused by the implementation, such as unused fiber connections in SB 1600, the effective cost of such an implementation is higher than an implementation with more efficiently utilized capacity. Sometimes, the unused capacity is referred to as stranded bandwidth, which results in higher effective implementation costs and lowered efficiency. Stranded bandwidth can result from several undesired instances of component or physical network implementation. For example, unused (dark) fiber in a network connection topology, including unused connections in a fiber shuffle device, can represent stranded bandwidth. Other examples include a connection that includes a single switch, such that optical signals from that switch on that connection have no terminating switch, or terminate on the same switch. Another example of stranded bandwidth can be seen in a connection from a switch to an undesired switch.

The problem of stranded bandwidth typically arises due to challenges in implementing a desired logical network topology in the presence of real world practical limitations on physical connectivity, including the difficulty of using one fixed fiber shuffle box to support a variable number of network nodes, as well as such other factors as number of available ports for a given switch/node and cabling used to implement connectivity. The fiber shuffle devices according to the present disclosure can support networks with an arbitrary number of nodes connected in a logical regular chordal ring with a fixed chordal ring structure and thus help to reduce planned connection overcapacity that is designed to handle a given network topology design at scale-out, thereby reducing or eliminating stranded bandwidth.

According to the design of SB 1600, a regular chordal ring with up to 6 nodes and a maximum chord length of 5 (optical reach of 5) can be implemented using a partially or fully populated SB 1600. In addition, connectors 1610 that make up Next/Previous set 1622 can be used to cascade additional SBs 1600 to form an arbitrarily large chordal ring topology with the same chordal structure as a network built with one SB 1600.

SB 1600, including connectors 1610 in Next/Previous set 1622, permits expansion of a given network by connecting more nodes to the existing SB 1600 or by adding additional SBs 1600. In each case, re-cabling of connections can be done at SB 1600. Such a facility for simplified and localized re-cabling significantly eases the challenges and complexity of scaling out a given network topology.

A single SB 1600 has a design suitable for use with a network topology that has from 1 to 6 nodes, with an optical reach of 5. However, it should be understood that the concept for network connectivity embodied in SB 1600 can be reduced or extended to an arbitrary sized network with K-nodes and an optical reach of R. For example, a fiber shuffle device in accordance with this aspect of the disclosure can be constructed to have an arbitrary number of connectors 1610 in either or both of East/West set 1620 or Previous/Next set 1622. The internal fiber connections can likewise be reduced or extended to accommodate the number of connectors 1610 and the number of fiber positions in connector 1610. Accordingly, the present disclosure is not to be considered limited to the six East/West connector pairs or the five Previous/Next connector pairs illustrated in FIG. 16. In addition, any regular sized chordal ring can be constructed with the number of expansion ports (each port being composed of an N connector and a corresponding P connector of Next/Previous set 1622, e.g.) being equal to the longest chord length of the desired network topology. Thus, in the general case, the number of connectors of a fiber shuffle device in accordance with the present exemplary embodiment is K+R×K+R, with K connectors being the number of connectors 1610 in East/West set 1620 with K being designated as E connectors and K as W connectors, and R connectors being the number of expansion connectors 1610 in Previous/Next set 1622 with R connectors being designated as Previous (P) and R connectors being designated as Next (N).

The desired chordal structure is determined by the internal connectivity of SB 1600 as is illustrated in Table 7 below.

TABLE 7

| | E0 | E1 | E2 | E3 | E4 | E5 | N1 | N2 | N3 | N4 | N5 |
|---|---|---|---|---|---|---|---|---|---|---|---|
| P5 | | | | | e | | | | | | |
| P4 | | | | d,e | | | | | | | |
| P3 | | | c-e | | | | | | | | |
| P2 | | b-e | | | | | | | | | |
| P1 | a-e | | | | | | | | | | |
| W0 | | a | b | c | d | e | | | | | |
| W1 | | | a | b | c | d | e | | | | |
| W2 | | | | a | b | c | d | e | | | |
| W3 | | | | | a | b | c | d | e | | |
| W4 | | | | | | a | b | c | d | e | |
| W5 | | | | | | | a | b | c | d | e |

In Table 7, a, b, c, d and e stand for chords of length 1, 2, 3, 4 and 5, respectively. In accordance with this exemplary embodiment, a chordal ring network topology can be implemented with chords a being composed of 8 fibers and chords b-e each being composed of 4 fibers in a 24 fiber cable/connector. Such an implementation would permit four chords of length 1 and two chords each of lengths 2, 3, 4 and 5 emanating and terminating at each node, in the case where each fiber carries one simplex signal. The mapping of the internal chordal fibers to the fibers in the connectors is arbitrary as long as it is consistent and properly assigns fibers to transmit or receive as appropriate. For example, chords a could be composed of fibers 1-8 of an MTP connector where fiber 1 on an E or N port is connected to fiber 4 of an W or P port and fiber 4 on an E or N port is connected to fiber 1 of an W or P port, representing one of the duplex chords between the E or N port and the W or P port.

The contents of Table 7, along with the specification of sets a, b, c, d and e, in this example, represents one internal connectivity scheme for implementing SB 1600, however, many others are possible, with the internal connectivity scheme being consistent or different across cascaded fiber shuffle devices in the case where more than one shuffle device is used. To implement a regular chordal ring network with a number of nodes larger than is supported by one shuffle device, cascaded shuffle devices can be utilized where the internal connectivity scheme can be consistent across cascaded fiber shuffle devices. For instance, to implement a regular chordal ring network with each node having four chords of length 1, four chords of length 2, no chords of length 3, 2 chords of length 4, and 2 chords of length 5, the shuffle box can be internally connected again with Table 7 but with a consisting of 8 fibers, b of 8 fibers, c of no fibers, d of 4 fibers, and e of 4 fibers, in the case where each fiber carries a single simplex connection. Thus Table 7 represents the general case of shuffle box supporting up to 6 nodes by itself implementing a chordal ring structure with maximum chordal length of 5. It should be understood that the specification in Table 7 can be used with an arbitrary number of nodes and associated fiber shuffle devices.

Connectors 1610 that are labeled, N1, N2, . . . N5 represent the "next" node, the second next node, . . . the 5th next node in the East direction, respectively. Connectors 1610 that are labeled P1 . . . P5 represent the "previous" node, the second previous node, . . . the 5th previous node in the West direction, respectively.

SB 1600 can be used to implement logical network topologies of various sizes with simplified physical connectivity and cabling. In addition, SB 1600 can help to reduce or eliminate stranded fiber or transceiver capacity that might otherwise be present with other types of physical cabling and connectivity arrangements, thereby creating a more efficient solution and reducing the effective optical and electro-optic costs of implementing a network. The steps for providing connectivity and cabling for various sized networks using SB 1600 are discussed below. It should be understood that reduced or extended size shuffle boxes with arbitrary numbers of connectors 1610 and corresponding internal wiring can utilize comparable steps to provide connectivity and cabling for various sized networks.

For less than or equal to 6 nodes: Connect up to 6 nodes to ports 0-5, with the east connector 1610 being connected to the east connector of the corresponding node and the appropriate west connector 1610 being connected to the west connector of the corresponding node. The first empty east connector 1610 is connected to P1, the second empty east connector 1610 is connected to P2, etc. In the special case where the network consists of 6 nodes, the first empty east connector 1610 is N1 so N1 is connected to P1, N2 is connected to P2, . . . N5 is connected to P5.

For more than 6 nodes: Cascade an arbitrary number of shuffle boxes by connecting N1 on the previous shuffle box to P1 on the next shuffle box, N2 to P2, etc. Connect the nodes as above for corresponding East and West connections. For example, in the case of seven nodes, the seventh node is connected to ports E0 and W0 of a second shuffle box. As above, the first unused east port of the second shuffle box is connected to P1 on the first shuffle box, etc. In the special case for SB 1600 where the total number of nodes is a multiple of 6, the first unused east port of the last shuffle box would be the N1 port, so the N1 port of the last shuffle box is connected to the P1 port of the first shuffle box, etc.

The above describes the rules for connecting nodes with a priori labeled E and W ports to shuffle boxes with ports also labeled E and W. However, in some cases the node may not a priori distinguish a port as E or W, may have multiple E and W pairs of ports, or may use another labeling schema such as N and S on some pairs. In other cases, the node may have more than 2 ports available, different ports of which are connected to different shuffle devices or directly connected. For example, a device could have E/W ports that are connected to an E/W fiber shuffle system, and N/S ports that are connected to a different N/S fiber shuffle system. The networks shown in FIGS. 7 and 9 can implement such a scenario, and/or such a scenario may be used to implement a torus like topology where each row or column is a regular chordal ring. So it should be understood that in some cases the connection of a given network node port to a W port on the fiber shuffle device would indicate that the network node port would be considered and labeled a W network node port, and similarly for E network node ports.

Figure 17:
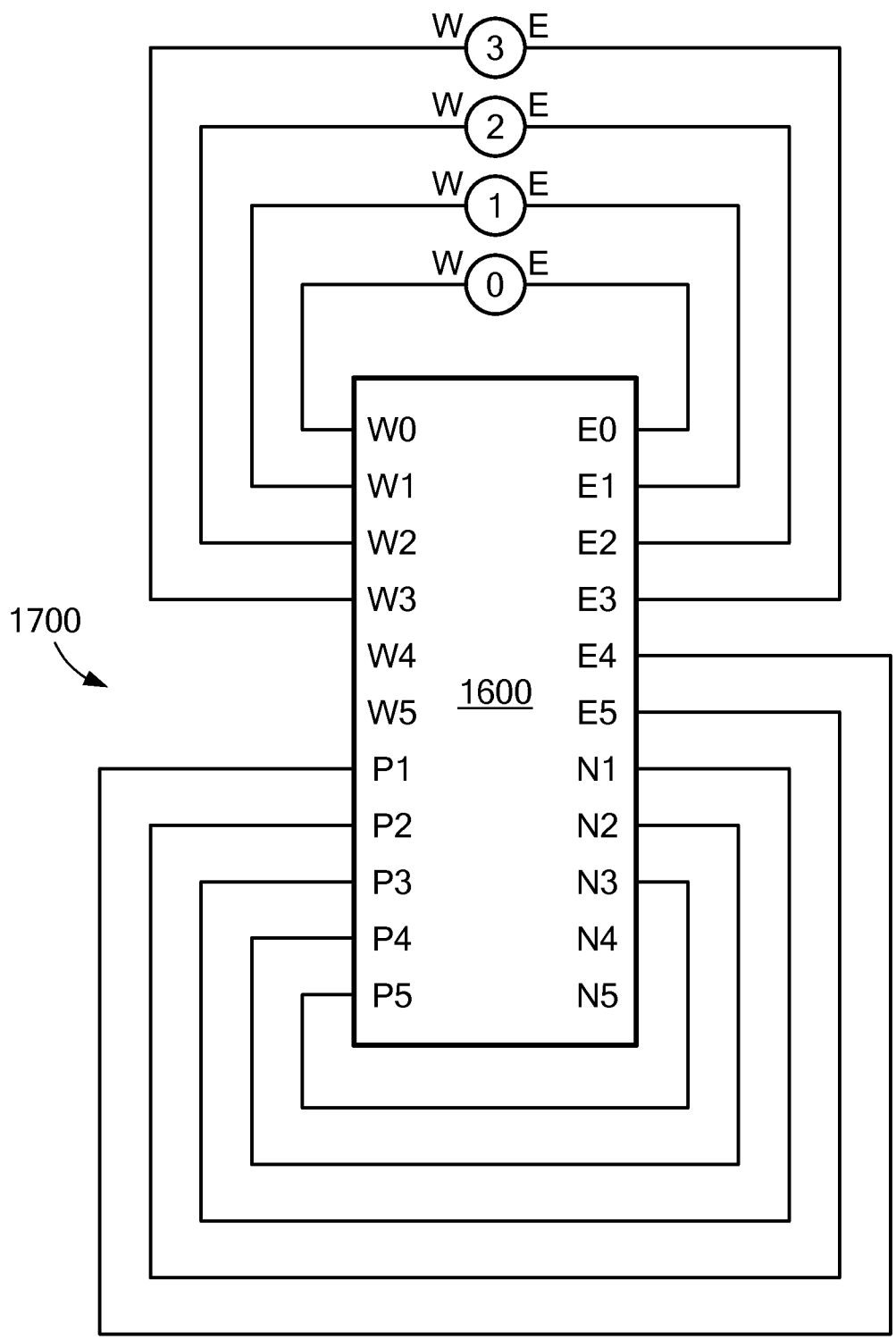
FIGS. 17, 18 and 19 are illustrations of connectivity configurations for four, six and eight nodes, respectively, in a chordal ring network using the connectivity device of FIG. 16.
Figure 19:
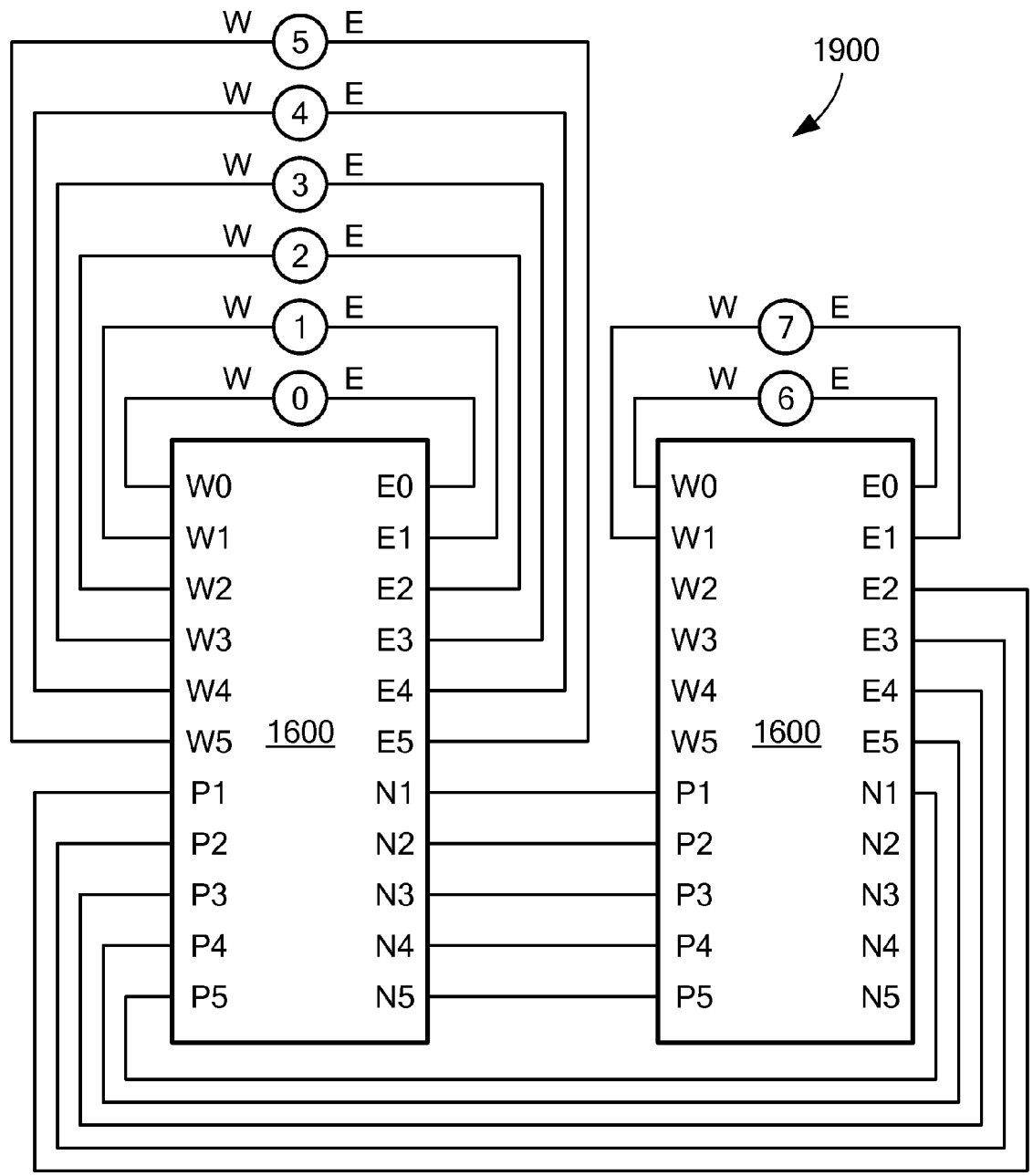

FIGS. 17-19 illustrate connectivity for one or more SBs 1600 in networks in which the nodes number four, six and eight, respectively, and are implemented with chordal ring topologies. FIG. 17 illustrates the case where the number of nodes is less than six with a four node configuration 1700. The four nodes in configuration 1700 are each connected to their respective East/West connections in SB 1600. The first empty East connector is E4, which is connected to P1, the next empty connector is E5, which is connected to P2, and so forth. Note that W4 and W5 are left unconnected, since no signal transits those connectors, and likewise N4 and N5 are not connected. Using the chart in Table 7, by following a connection from any of nodes 0-3 shown in configuration 1700, any other node can be reached in one hop. For example, the East side of node 0 has a connection to E0, which is directly connected to P1, as shown in the chart in Table 7. In configuration 1700, P1 is externally connected to E4, which can be connected to any of the West connectors of the nodes 0-3, as shown in column E4 of Table 7.

Referring to FIG. 18, a six node chordal ring is shown implemented with SB 1600 in a configuration 1800. Configuration 1800 is similar to the configuration of fiber MUX 1000 shown in FIG. 10. In configuration 1800, N1 represents the first empty East connector, which is directly connected to P1, and N2 represents the next empty East connector and is connected to P2 and so forth. Again, using the chart in Table 7, a mapping of how each node is connected to all other nodes in the topology is provided, so that at least one signal path from one node to any other node in the topology can be realized.

Referring now to FIG. 19, a configuration 1900 is illustrated with two SBs 1600 for implementing an eight node chordal ring. A single SB 1600 will not support 8 nodes by itself, so an additional cascaded SB 1600 provides the additional connectivity to construct an 8 node regular chordal ring network. As noted previously, N1 on the first SB 1600 is connected to P1 on the second SB 1600, N2 is connected to P2 and so on with N5 being connected to P5. The first empty East connector of the second SB 1600 is E2, which is connected to P1 on the first SB 1600. Likewise, each of the remaining East connectors E3-E5 on the second SB 1600 is connected to P2-P5 on the first SB 1600. Note that all the connectors of the first SB 1600 are populated, while connectors N2-N5 and W2-W5 are left unconnected on the second SB 1600.

Note that the nodes slide down the east connectors but not the west connectors, i.e. when a shuffle box is not fully populated, node connectors are used as expansion connectors on the East side, but these always connect to the fixed expansion connectors on the West side. As an example, if the number of nodes deployed is four, then E4 is connected to P1 since E4 is the first empty East connector. E5 is connected to P2 since E5 is the second empty East port. N1 is connected to P3, N2 to P4 and N3 to P5. N4 and N5 are left empty as no signals reach those connectors. This connectivity configuration is illustrated in FIG. 17.

Note that a signal might traverse a shuffle box three times, e.g., from shuffle box 1 to shuffle box 2→shuffle box 1 again. For example, in a seven node system, a path from the West side of node 4 to reach node 2 would consist of six optical segments: (1) starting at the West side of node 4, entering shuffle box 1 at connector W4; (2) which according to the $10^{th}$ row of Table 7, connects with connector N4 on the e fibers; (3) connector N4 is externally connected to connector P4 at shuffle box 2; (4) according to the $2^{nd}$ row of Table 7, P4 connects with E3 at shuffle box 2 on the e fibers; (5) E3 on shuffle box 2 is externally connected to P3 on shuffle box 1; and (6) according to the $3^{rd}$ row of Table 7, P3 on shuffle box 1 connects with E2 on the e fibers, leading to the East side of node 2.

According to another exemplary embodiment of this aspect of the disclosure, a thirteen node shuffle box design implementing a chordal ring with optical reach twelve is provided. This larger chordal rings has chords +/−1, 2, 3, 4, . . . 12 for each node and the design would look as follows:

25×25 Ports, each being as 24 pin connector
12 West node ports labeled W0, W1, . . . W12
12 East node ports labeled E0, E1, . . . E12
12 West expansion ports labeled P1, P2, . . . , P12
12 East expansion ports labeled N1, N2, . . . , N12
West node port i is internally connected to East node port i+r, for r=1, 2, . . . 12. If i+r>12, then i is connected instead to east expansion port Nj, where j=i+r−12.
West expansion port Pi is internally connected to East node port i−1, for i=1 . . . 12 with chords i, i+1, i+2, . . . 12.

According to another exemplary embodiment of this aspect of the disclosure, a twelve node design implementing a chordal ring with an optical reach of twelve is provided. For such a twelve node design with chords of +/−1, 2, 3, 4, . . . 12 for each node, the design would look as follows:

24×24 Ports, each being as 24 pin connector
        12 West node ports labeled W0, W1, . . . W11
        12 East node ports labeled E0, E1, . . . E11
        12 West expansion ports labeled P1, P2, . . . , P12
        12 East expansion ports labeled N1, N2, . . . , N12
    West node port i is internally connected to East node port i+r, for r=1, 2, . . . 12. If i+r>11, then i is connected instead to east expansion port Nj, where j=i+r−11.
    West expansion port Pi is internally connected to East node port i−1, for i=1 . . . 12 with chords i, i+1, i+2, . . . 12.

These configurations can be generalized for the number of nodes supported in a single shuffle box and a maximal chordal reach. Let K be the size of the shuffle box, i.e. the number of nodes that the shuffle box supports without cascading another shuffle box. The first K nodes are hooked to shuffle box 1. The Kilst node is hooked to shuffle box 2, which is connected to shuffle box 1 thru the expansion ports. The design uses R expansion ports in each direction where R is the longest chord in the desired chordal ring topology consisting of C_r duplex chords of length r, r=1, . . . R. Note that a given C_r could be 0 indicating no chords of that length.

(K+R)×(K+R) Ports, each being as 24 pin connector
        K West node ports labeled W0, W1, . . . W(K−1)
        K East node ports labeled E0, E1, . . . E(K−1)
        R West expansion ports labeled P1, P2, . . . , PR
        R East expansion ports labeled N1, N2, . . . , NR
    West node port i is internally connected to East node port i+r, for r=1, 2, . . . R with C_r fiber pairs. If i+r>K−1, then is connected instead to east expansion port Nj with C_r fiber pairs, where j=i+r−(K−1).
    West expansion port Pi is internally connected to East node port i−1, for i=1 . . . R with all the fiber pairs for chords i, i+1, i+2, . . . R.

Note, as before, the mapping of the C_r fiber pairs to fibers on the connectors is arbitrary as long as it is consistent and properly maps transmit to receive, which might require flipping the transmit/receive internal to the box to be consistent with MTP cables which perform the same function.

As shown in the above examples, arbitrarily sized regular chordal ring topologies can be supported with a single cascadable shuffle box. When shuffle boxes are not fully populated, some signals traverse one shuffle box twice and another one once, for a total of 3 traversals. Such an optical path reflects a maximum of eight connectors end to end for a loss of 6 dB when the maximum loss per connector is 0.75 dB as is typical in an MTP 24 connector. Such a loss is within a cost effective optical loss budget.

It may be desirable for scalability to implement a larger chordal ring, e.g. R=12 in order to build cliques of size twelve or twenty four; each clique might represent a POD. In that case, a six node shuffle box of size 18×18 could be used, or a twelve node shuffle box of size 24×24 could be used. In this case, a shuffle box of size of twelve or thirteen would be a more practical fit.

Also, as shown earlier, the optical reach R represents the maximum chordal length in the desired chordal ring network. The design supports any chordal ring network with maximum length R, and arbitrary multiplicity of chords. Note that not all chords lengths up to R need be included in the design.

The various embodiments described herein can employ multifiber MTP connectors. However, the present disclosure is not to be considered to be so limited. For example, the inputs can include one or more multicore fibers and the internal wiring has the capability of routing individual cores between connectors, e.g., by breaking them out onto individual fibers internally.

Also, embodiments described herein can use one internal fiber per simplex connection. However, bi-directional communication can be used for duplex connections per fiber, thereby reducing the number of fibers, such as by, for example, half. Additionally, or alternatively, passive WDM technology could be implemented internal or external to the shuffle box to increase the number of chords per internal connection.

Moreover, some or all of the embodiments discussed herein can implement an electrical or electro-optical cross connect in some nodes and/or in the fiber shuffle devices that can direct electrical signals to and/or between desired optical transceivers supporting a given chord at a node or fiber shuffle device. Among other things, a cross connect allows chords to be stitched together to form longer chords, e.g. longer than might be permissible by the chordal reach of the shuffle box. For instance, a chord of length 3 and a chord of length 5 might be stitched together within a node to form a chord of length 8. Such cross connects might also be used to stitch chords together of different chordal rings, e.g. stitching together an E-W chord with a N-S chord in a torus like network to produce a diagonal chord connecting two nodes which are not in the same row or column of the torus.

Moreover, some or all of the embodiments discussed herein can implement an optical cross connect within, before and/or after one or more cascaded fiber shuffle devices. For instance, such a device could be used to assign a node to a particular part of the chordal ring network, e.g. a cross connect between all the node's ports to all the shuffle box ports could be used to determine the order of the nodes in the resultant chordal ring which is useful for traffic management. For example, in a large chordal ring network, if two nodes had a lot of traffic between them, then it may be desired to put the two nodes close together on the chordal ring, e.g. within the reach of the longest chord, in order to prevent large volumes of traffic having to electro-optically multi-hop thru one or more intermediate nodes.

It should also be noted that where the term "port" is used to describe fiber shuffle device connectors and/or node connectors, the implementation is not to be considered to be so limited. For example, although each port or connector can be implemented as an MTP multi-fiber connector, it should be clear that a port or connector can be implemented as multiple MTP multi-fiber connectors or as multiple ports that are grouped and share a common MTP connector. For instance, a node can have E and W ports that can be grouped onto a single MTP connector. The single MTP connector can be plugged into a single E/W MTP connector on a fiber shuffle device, which internally separates E and W fibers in the MTP connector and then implements internally the desired connectivity as described herein. It is also possible that such grouping and ungrouping can be implemented with break-out cables or patch panels that are part of, inline prior to and/or inline after the fiber shuffle device(s). For instance, a node might have each E and W port connected in a single MTP-24 cable which is then broken out into two MTP-12 cables, one for E and one for W, using a break-out cable for connection to a fiber shuffle device whose that provides MTP-12 connectors.

The presently disclosed devices and methods obtain a number of advantages, including the simplified implementation of topologies such as a ring mesh and 2-D and 3-D meshes, which can take advantage of simplified cabling and reduced costs. For example, the overall optical cost can be reduced to about one quarter of the typical conventional costs. Expansion or scale-out of the networks can be achieved with a minimum of cabling changes, the majority of which can be done at local shuffle boxes. The efficiency of cabling and connectivity, especially when networks are scaled-out, make the above described disclosure highly advantageous and attractive to network implementations.

The foregoing description has been directed to particular embodiments of the present disclosure. It will be apparent, however, that other variations and modifications may be made to the described embodiments, with the attainment of some or all of their advantages. The scope of the appended claims is therefore not to be limited to the particular embodiments described herein, and is intended to cover all such variations and modifications as come within the true spirit and scope of the present disclosure.

What is claimed is:

1. A fiber shuffle device configured to implement connectivity for a chordal ring network, the fiber shuffle device comprising:
   a housing that includes a connector panel;
   a plurality of optical connectors mounted to the connector panel, each optical connector being operative to receive an optical cable connection,
   the plurality of optical connectors comprising optical connectors being identified with an optical node group and optical connectors being identified with an expansion group,
   each of the optical connectors in the optical node group and the expansion group being associated with a first or a second topology direction;
   a first plurality of optical fibers, each fiber of the first plurality of optical fibers coupling an optical connector in the optical node group to an optical connector in the expansion group such that at least some of the optical connectors in the optical node group that are associated with the first topology direction are coupled via optical fibers to optical connectors in the expansion group that are associated with the second topology direction; and
   a second plurality of optical fibers, each fiber of the second plurality of optical fibers coupling an optical connector in the optical node group to another optical connector in the optical node group such that at least some of the optical connectors in the optical node group that are associated with the first topology direction are coupled via optical fibers to optical connectors in the optical node group that are associated with the second topology direction,
   wherein the first plurality of optical fibers and the second plurality of optical fibers are internal connections within the housing.

2. The fiber shuffle device according to claim 1, wherein the first topology direction is East and the second topology direction is West.

3. The fiber shuffle device according to claim 1, wherein:
   at least one of the optical connectors in the expansion group of the first topology direction is directly connected via an external fiber optic jumper to an optical connector in an expansion group of the second topology direction of another fiber shuffle device to form cascaded fiber shuffle devices for implementing the chordal ring network.

4. The fiber shuffle device according to claim 1, further comprising at least four optical transceivers, each of the at least four optical transceivers communicably coupling a respective one of the at least four optical connectors to a cross point switch, the cross point switch operative to direct a signal received at a selected one of the at least four optical connectors to a different selected one of the at least four optical connectors for transmission therefrom.

5. A fiber shuffle device for implementing network connectivity, comprising:
   a housing that includes a connector panel;
   a plurality of optical connectors mounted to the connector panel, each of the optical connectors being operative to receive an optical cable connection;
   the plurality of optical connectors comprising optical connectors being identified with an optical node group and optical connectors being identified with an expansion group,
   wherein the optical connectors being identified with the expansion group are free of internal connections between each other;
   a first plurality of optical fibers, wherein each fiber of the first plurality of optical fibers couples an optical connector in the optical node group to an optical connector in the expansion group; and
   a second plurality of optical fibers, wherein each fiber of the second plurality of optical fibers couples an optical connector in the optical node group to another optical connector in the optical node group, and
   wherein the first plurality of optical fibers and the second plurality of optical fibers are internal connections within the housing.

6. The fiber shuffle device according to claim 5, wherein:
   at least one optical connector in the optical node group is directly connected via a first external fiber optic jumper to an optical node; and
   at least one optical connector in the expansion group is directly connected via a second external fiber optic jumper to an optical connector of another fiber shuffle device to form cascaded fiber shuffle devices for implementing the chordal ring network.

7. The fiber shuffle device according to claim 5, further comprising at least four optical transceivers, each of the at least four optical transceivers communicably coupling a respective one of the at least four optical connectors to a cross point switch, the cross point switch operative to direct a signal received at a selected one of the at least four optical connectors to a different selected one of the at least four optical connectors for transmission therefrom.

8. The fiber shuffle device according to claim 5, wherein:
   the fiber shuffle device includes K optical connectors in the optical node group, and
   at least one of the optical connectors in the expansion group is directly connected via an external fiber optic jumper to another optical connector in the optical node group when the fiber shuffle device is connected to a number of optical nodes less than K.

9. The fiber shuffle device according to claim 5, wherein:
   the fiber shuffle device includes K optical connectors in the optical node group, and
   at least one of the optical connectors in the expansion group is directly connected via an external fiber optic jumper to an optical connector of another fiber shuffle device to form cascaded fiber shuffle devices when the cascaded fiber shuffle devices are connected to a number of optical nodes greater than K.

10. The fiber shuffle device according to claim 5, further comprising multiple optical fiber pairs being coupled between an optical connector in the optical node group and an optical connector in the expansion group.

11. The fiber shuffle device according to claim 5, further comprising a plurality of external fiber optic jumpers,
 wherein the plurality of external fiber optic jumpers provide direct, physical, passive fiber optic connections between the optical connectors within the expansion group.

12. The fiber shuffle device according to claim 1, wherein:
 a first optical connector in the optical node group that is associated with the first topology direction is connected via optical fibers in the first plurality to each optical connector in the expansion group that is associated with the second topology direction and is free of internal connections to other optical connectors in the optical node group;
 a second optical connector in the optical node group that is associated with the first topology direction is connected via optical fibers in the second plurality to each other optical connector in the optical node group that is associated with the second topology direction and is free of internal connections to optical connectors in the expansion group; and
 a third optical connector in the optical node group is connected via optical fibers in the first plurality to at least one optical connector in the expansion group and connected via optical fibers in the second plurality to at least one optical connector in the optical node group.

\* \* \* \* \*